(12) United States Patent
Drabbels et al.

(10) Patent No.: US 8,500,522 B2
(45) Date of Patent: Aug. 6, 2013

(54) DEVICE AND METHOD FOR PROCESSING A CARCASS PART OF SLAUGHTERED POULTRY

(75) Inventors: Richard Gerard Johan Drabbels, Venray (NL); Petrus Christianus Hendrikus Janssen, Wilbertoord (NL); Erik Hendrikus Werner Peters, Boxmeer (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 29 days.

(21) Appl. No.: 13/508,476

(22) PCT Filed: Dec. 1, 2010

(86) PCT No.: PCT/NL2010/050807
§ 371 (c)(1),
(2), (4) Date: May 7, 2012

(87) PCT Pub. No.: WO2011/068402
PCT Pub. Date: Jun. 9, 2011

(65) Prior Publication Data
US 2012/0225616 A1    Sep. 6, 2012

(30) Foreign Application Priority Data

Dec. 3, 2009  (NL) ...................................... 2003900

(51) Int. Cl.
*A22C 17/00* (2006.01)
(52) U.S. Cl.
USPC ........................................................ 452/136

(58) Field of Classification Search
USPC .................... 452/125, 127–130, 54, 153–155, 452/165–169, 187–189, 170
See application file for complete search history.

(56) References Cited

U.S. PATENT DOCUMENTS

| 4,648,156 | A |   | 3/1987  | Meyn |
| 4,688,297 | A | * | 8/1987  | Bartels ........................... 452/135 |
| 5,098,337 | A | * | 3/1992  | Landt et al. .................... 452/136 |
| 5,372,539 | A | * | 12/1994 | Kunig et al. .................... 452/136 |
| 5,545,083 | A | * | 8/1996  | Bargele et al. ................. 452/136 |
| 5,643,074 | A | * | 7/1997  | Linnenbank ................... 452/165 |
| 5,827,116 | A | * | 10/1998 | Al et al. ......................... 452/170 |
| 5,833,527 | A |   | 11/1998 | Hazenbroek et al. |
| 6,007,416 | A | * | 12/1999 | Janssen et al. ................. 452/135 |

(Continued)

FOREIGN PATENT DOCUMENTS

| EP | 1 430 780 A1 | 6/2004 |
| EP | 1 454 531 A2 | 9/2004 |
| EP | 2 289 340 A2 | 3/2011 |

*Primary Examiner* — Richard Price, Jr.
(74) *Attorney, Agent, or Firm* — Birch, Stewart, Kolasch & Birch, LLP

(57) ABSTRACT

A device for separating a wishbone from a carcass part of slaughtered poultry, includes a primary wishbone knife, for separating the wishbone from meat that is naturally present thereon in the plane of the wishbone, wherein the primary wishbone knife is adapted to be introduced into and removed from the carcass part via the neck opening, two secondary wishbone knives, each for separating the wishbone from meat that is present on the outside of a leg of the wishbone, and a secondary wishbone knives actuator assembly. The secondary wishbone knives actuator assembly prescribes a secondary cutting path for each of the secondary wishbone knives relative to the carcass part. The secondary cutting paths have a curved shape that substantially follows the outer contour of the wishbone.

49 Claims, 20 Drawing Sheets

Figure 1A:
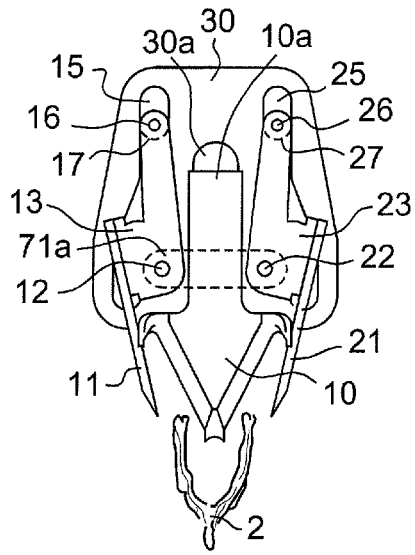

U.S. PATENT DOCUMENTS 6,935,942 B1 * 8/2005 Evers et al. .................. 452/157
7,357,707 B2 * 4/2008 de Vos et al. .................. 452/136
8,192,258 B2 * 6/2012 Janssen et al. ................ 452/136
8,231,444 B2 * 7/2012 De Vos et al. ................ 452/136

* cited by examiner

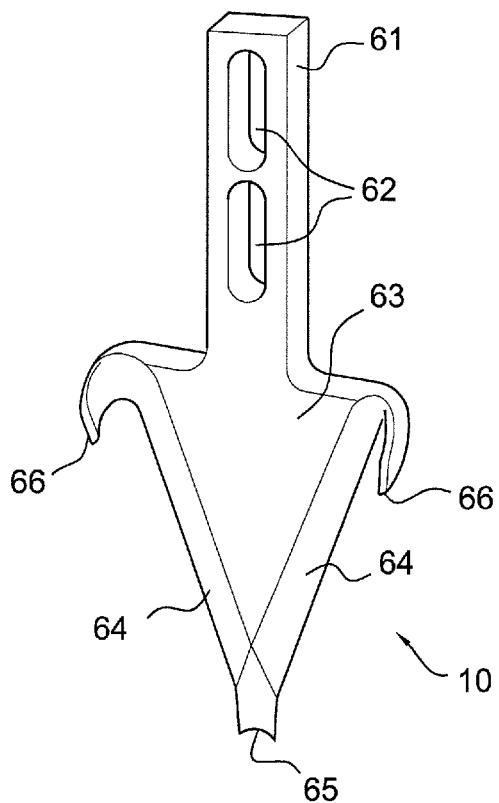
Fig. 6A1
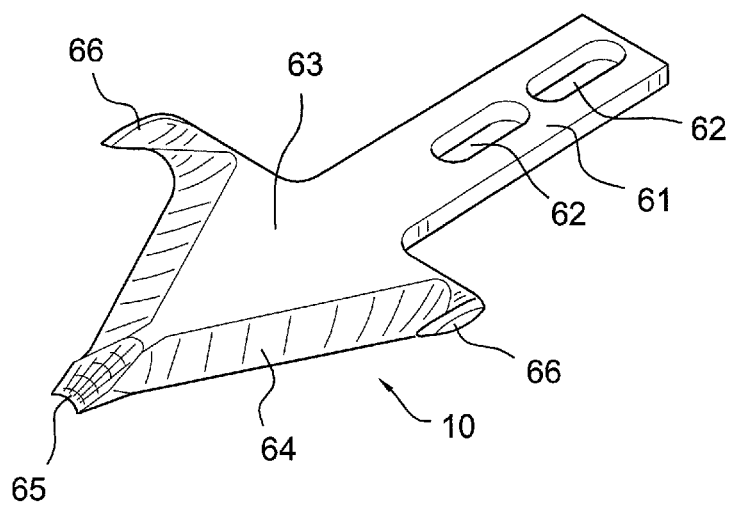
Fig. 6A2

DEVICE AND METHOD FOR PROCESSING A CARCASS PART OF SLAUGHTERED POULTRY

The invention pertains to a device and a method for processing a carcass part of slaughtered poultry. The invention is particularly directed to cutting loose the wishbone from said carcass part.

EP1430780 describes a device and method for cutting loose the wishbone and optionally removing the wishbone from the carcass part. In the known device and method, a support block that has a substantially triangular shape is introduced into the carcass part via the neck opening. The support block is brought into a position in which it supports the wishbone. The wishbone is arranged into a recess at the circumference of the support block. An arrow shaped knife then slides over the substantially flat top surface of the support block, cutting loose the wishbone from the meat on the wishbone in a plane substantially parallel to the plane of the wishbone. Then, two stabbing knives slide alongside the support block, one on the left had side and one on the right hand side. These stabbing knives cut the wishbone loose from the meat on the respective sides of the wishbone, along the outside of the legs of the wishbone. If the wishbone is to be removed from the carcass part, the support block, the arrow shaped knife and the stabbing knives are then retracted from the carcass part together, with the wishbone being arranged between them. The arrow shaped knife and the stabbing knives are then retracted from the support block. The wishbone is removed from the support block by means of compressed air that blows the wishbone off the support block. When using this known method and device, the wishbone is cut through near the wishbone joints. By "wishbone joint", the connection between the wishbone (clavicula) and the collar bones (coracoids) is meant. On both sides of the carcass part, a part of the wishbone remains attached to the wishbone joint, and via the wishbone joint, to the collar bone (coracoid).

It has turned out that this method of separating the wishbone from the carcass part leaves quite some meat on the wishbone.

The object of the invention is to provide an improved device and method for separating the wishbone from a carcass part of slaughtered poultry.

In accordance with the first aspect of the invention, the invention proposes a device of and a method for separating a wishbone from a carcass part of slaughtered poultry.

The device according to the first aspect of the invention is of the type that is known from EP1430780. This device comprises a primary wishbone knife. The primary wishbone knife is used to cut loose meat from the wishbone (clavicula) that is situated in a plane parallel to the plane of the wishbone.

The primary wishbone knife is introduced into and removed from the carcass part via the neck opening. In a possible embodiment, this is achieved by moving the primary wishbone knife by a primary wishbone knife actuator assembly along a primary cutting path. The primary cutting path extends between a first position, in which the primary wishbone knife is outside the carcass part, and a second position, in which the primary wishbone knife is arranged inside the carcass part, adjacent to the wishbone and behind the wishbone. The primary cutting path is such that the primary wishbone knife is introduced into and removed from the carcass part via the neck opening.

The primary wishbone knife preferably has an arrow-like shape.

The device according to the first aspect of the invention further comprises two secondary wishbone knives. Each of them separates the wishbone from meat that is naturally present on the outside of the legs of the wishbone.

The device according to the first aspect of the invention further comprises a secondary wishbone knives actuator assembly. This secondary wishbone knives actuator assembly is adapted to prescribe a secondary cutting path for each of the secondary wishbone knives.

For each of the secondary wishbone knives, the secondary cutting path extends between a first position, in which said secondary wishbone knife is outside the carcass part and a second position, in which said secondary wishbone knife is arranged inside the carcass part, adjacent to the wishbone and outside of the legs of the wishbone.

In accordance with the first aspect of the invention, the cutting paths of the secondary wishbone knives are curved and they follow—at least substantially—the outer contour of the wishbone. This results is less meat on the removed wishbone, so it enables a higher yield of the harvested meat from the carcass parts. The cutting path is imposed on each of the secondary wishbone knives; the secondary wishbone knives actuator assembly prescribes the path which the knives have to follow.

The prescribed path can be determined by the hardware of the device, for example by means of a combination of a cam track and cam follower. It could also be that the path is determined by the controls of the device, for example by software that drives one or more servo motors.

The curved path of the secondary wishbone knives can be made up out of straight lines that are at an angle relative to each other. Alternatively, the curved path can be made up out of one or more curves, or it can be made up of a combination or straight lines and curves. So, the movement of the secondary wishbone knives can comprise a translation, a rotation and/or a combination thereof.

The wishbone generally has the shape of a horseshoe, with two curved legs. At the tip, where the legs meet, a protruding bone plate is present. Each of the secondary cutting paths substantially follows the outer contour of one leg of the wishbone. Near the tip of the wishbone, it is possible that the secondary cutting path takes some more distance from the bone structure of the wishbone, in order to reach the free end of the protruding bone plate in an easy manner. However, in a more sophisticated embodiment, it is possible that each of the secondary wishbone knives follows the outer contour of one of the legs of the wishbone all the way up to the protruding bone plate, and that after reaching this point, they scrape along one side of the bone plate all the way to the free end of the bone plate.

In either embodiment, it is advantageous if the two secondary wishbone knives meet at the free end of the protruding bone plate. This way, they can separate the free end of the bone plate from the adjacent meat of the carcass part, e.g. by cutting through the tendons in a scissor-like action.

In an advantageous embodiment, the device according to the first aspect of the invention comprises a wishbone support block, which is introduced into the carcass part via the neck opening. Preferably, the wishbone support block is brought from a first position outside the carcass part to a second position, in which it supports the wishbone. In a possible embodiment, the wishbone support block comprises one or more recesses in which the wishbone, e.g. the legs thereof, is accommodated when the support block is in its second position. The support block in its second position is preferably arranged between the legs of the wishbone.

In a further advantageous embodiment, when the support block, the primary wishbone knife and the secondary wishbone knives are in their respective second positions at the same time, they substantially hold the wishbone in a pocket formed by said knives. In this embodiment, it is possible that the wishbone is removed from the carcass part by retracting the support block, the primary wishbone knife and the secondary wishbone knives simultaneously from the carcass part. During the retraction movement from the carcass part, the support block, primary wishbone knife and secondary wishbone knives preferably maintain their relative positions to each other, so that the wishbone remains retained by them during the retraction movement from the carcass part.

In an advantageous embodiment, the secondary wishbone knives actuator assembly comprises a cam track for controlling the movement of at least one secondary wishbone knife. The secondary wishbone knives actuator assembly can comprise a cam track per secondary wishbone knife, or one cam track for controlling the movement of all secondary wishbone knives. It is advantageous to use one or more cam tracks for the control of the movement of the secondary wishbone knives as cam track control is generally sturdy and able to withstand the harsh conditions of a poultry processing plant.

In combination with the cam track or cam tracks, it is advantageous if the secondary wishbone knives are mounted on a coupler or slide that is moveable relative to the cam track.

In an advantageous embodiment, the primary wishbone knife and the secondary wishbone knives are mounted on such a coupler or slide. Preferably, the secondary wishbone knives are pivotable relative to the coupler or slide. The pivoting of the secondary wishbone knives can be controlled by the cam track of the secondary wishbone knives actuator assembly. This way, the coupler or slide can provide a translation and the cam track can provide a rotation for the secondary wishbone knives, which together makes it possible to use optimal secondary cutting paths.

In an embodiment, the secondary wishbone knives have a leading edge, which is inclined. This is advantageous because when using secondary wishbone knives with such a shape, the risk of damaging the fillet, in particular the inner filet, during the cutting loose of the wishbone is reduced. Preferably, the leading edge is tapered in the plane of the knife.

Advantageously, a plurality of wishbone separating devices according to the invention is mounted on a carrousel.

Advantageously, the carrousel comprises one or more cam tracks for controlling the movement of one or more parts of the devices. For example, cam tracks can be used to control the movements of the primary wishbone knife, the secondary wishbone knives, the wishbone support block and/or the coupler or slide for the secondary wishbone knives.

The devices according to the invention, being arranged on a carrousel or not, can be used in a system for processing carcass parts of slaughtered poultry. Such a system comprises, apart form one or more devices according to the invention, a transport system for moving the carcass parts to be processed along a track, said transport system being provided with a plurality of carriers for carrying the carcass parts to be processed. Preferably, the carriers are moveable relative to the track in a plurality of planes.

In an advantageous embodiment, the system further comprises a positioner for positioning a carrier relative to a device according to the invention.

In an advantageous embodiment, the system further comprises a positioner for positioning the carcass part to be processed relative to a device according to the invention.

In the device according to the first aspect of the invention, the primary wishbone knife, the secondary wishbone knives and if present the wishbone support block are moveable relative to the carcass part from which the wishbone is separated. The carcass part will preferably be arranged on a carrier that is either stationary or transported by a transport system along a track. The actuator assembly or actuator assemblies for driving the movement of the primary wishbone knife, the secondary wishbone knives and if present the support block can be arranged in the separating device, so the carrier holds the carcass part stationary relative to the device and the primary wishbone knife, the secondary wishbone knives and if present the support block move towards the carrier in order to perform their actions. It is however also possible that the carrier is moved towards the primary wishbone knife, the secondary wishbone knives and if present the support block to obtain the desired relative movement of the primary wishbone knife, the secondary wishbone knives and if present the support block on the one hand and the carcass part on the other. Of course, a combination can be used alternatively.

In the device and method according to the second aspect of the invention, the wishbone is cut loose from the other bone parts of the carcass part, in particular from the coracoids, by means of dedicated wishbone joint cutters that are arranged inside the carcass part when performing their cutting action.

The device and method according to the second aspect of the invention allow the wishbone joints to be cut in an anatomical way, which means that no bones are cut through. Instead, the cutter moves through the joint between the bones, cutting only soft tissue such as tendons and ligaments. This reduces the risk of bone splinters in the meat considerably. In particular, the wishbone joint cutter moves between the acrocoracoid and the tuberositas furcularis.

The device according to the second aspect of the invention comprises two wishbone joint cutters, that have an active position and an inactive position. The wishbone joint cutters are moved from their inactive position to their active position and vice versa by a wishbone joint cutters actuator assembly.

The wishbone joint cutters are mounted on a support, which is moveable between a first position and a second position by a support actuator device. The first position of the support is outside the carcass part to be processed, while the second position is inside the carcass part to be processed. The support is introduced into and removed from the interior of the carcass part via the neck opening.

It is possible to combine the device according to the second aspect of the invention with a wishbone separating assembly, so that the wishbone is not only cut loose from the coracoids, but also from the rest of the carcass part.

In such an embodiment, the wishbone joint cutters could for example be mounted on the primary wishbone knife, which in such an embodiment therewith acts as the support for the wishbone joint cutters.

In their active position, the wishbone joint cutters project outside the contour of the support on which they are mounted. During at least a part of the movement of the support, each of the wishbone joint cutters extends into the region between a leg of the wishbone and the coracoid adjacent thereto.

The wishbone joint cutters are introduced into the carcass part when the support that supports the wishbone joint cutters is moved from its first position to its second position. The support and the wishbone joint cutters are introduced into the carcass part via the neck opening of the carcass part. The wishbone joint cutters are in their inactive position when they are introduced into the carcass part.

After the support has reached its second position, it is moved back again to its first position.

At some point between the passing of the wishbone joints on the way from the first position to the second position of the support and before the passing of the wishbone joints on the way from the second position to the first position of the support, the wishbone joint cutters are brought into their active position. In this active position, the wishbone joint cutters extend beyond the outer contour of the support.

The wishbone joint cutters remain in their active position until they have passed the wishbone joints on their way from the second position of the support to the first position of the support. During the passing of the wishbone joints, the wishbone joint cutters cut through the wishbone joints, thereby disconnecting the end of the wishbone from the end of the adjacent coracoid. Preferably, the wishbone joint cutters move between the bone parts in the wishbone joint, in particular between the acrocoracoid and the tuberositas furcularis, when cutting the wishbone joint, cutting only through soft tissue such as tendons and ligaments. This gives a smooth, clean cut, without bone splinters and/or sharp bone edges.

The present invention also relates to a method of processing a poultry carcass part wherein use is made of a device according to the invention.

The invention will be described in more detail below under reference to the drawing, in which in a non-limiting manner exemplary embodiments of the invention will be shown.

Figure 3A:
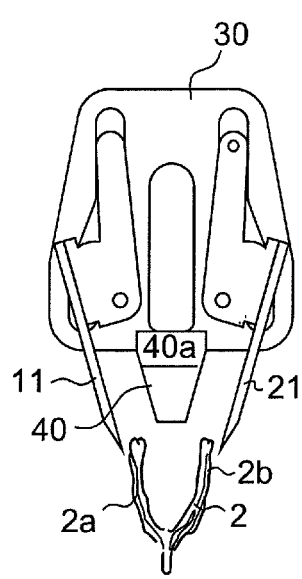
Figure 3B:
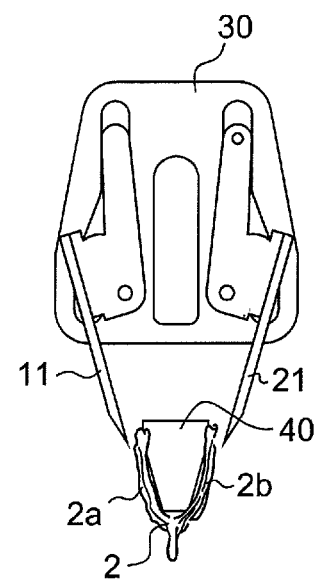
Figure 4:
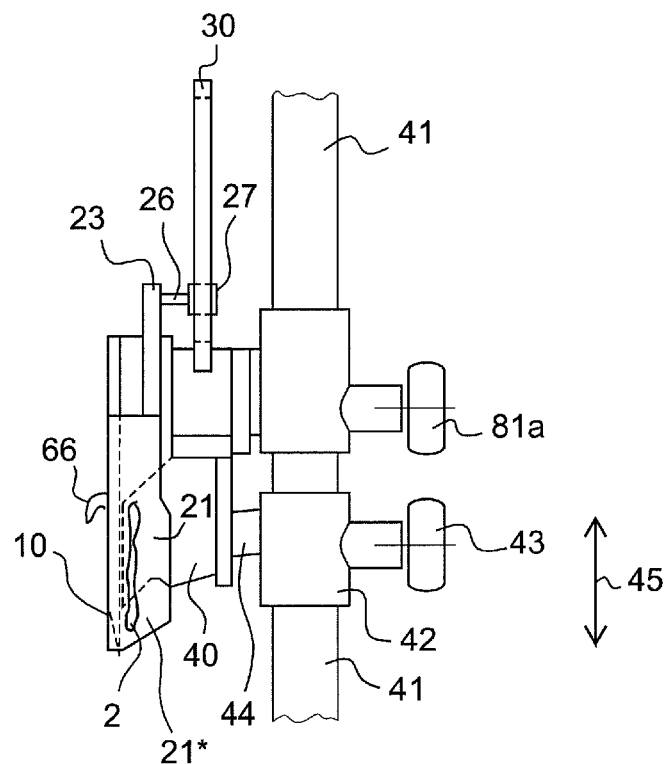
Figure 5:
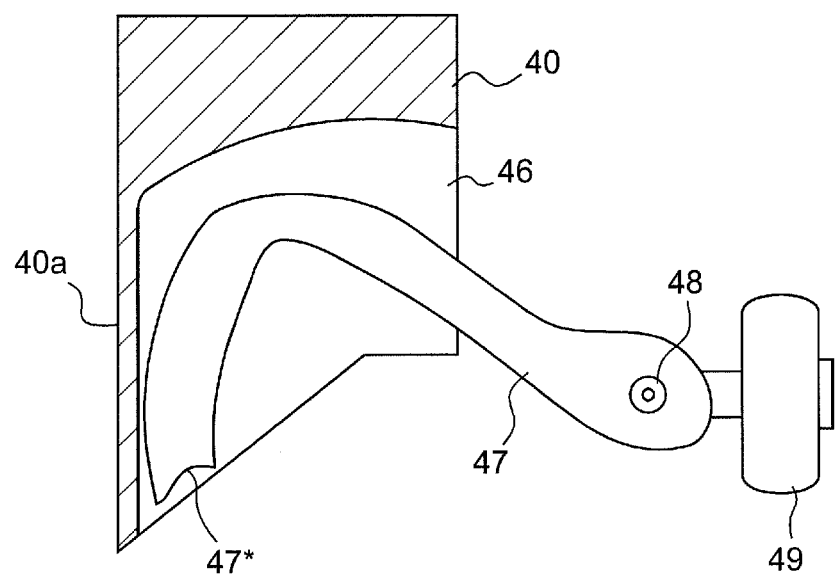
Figures 6B, 6C:
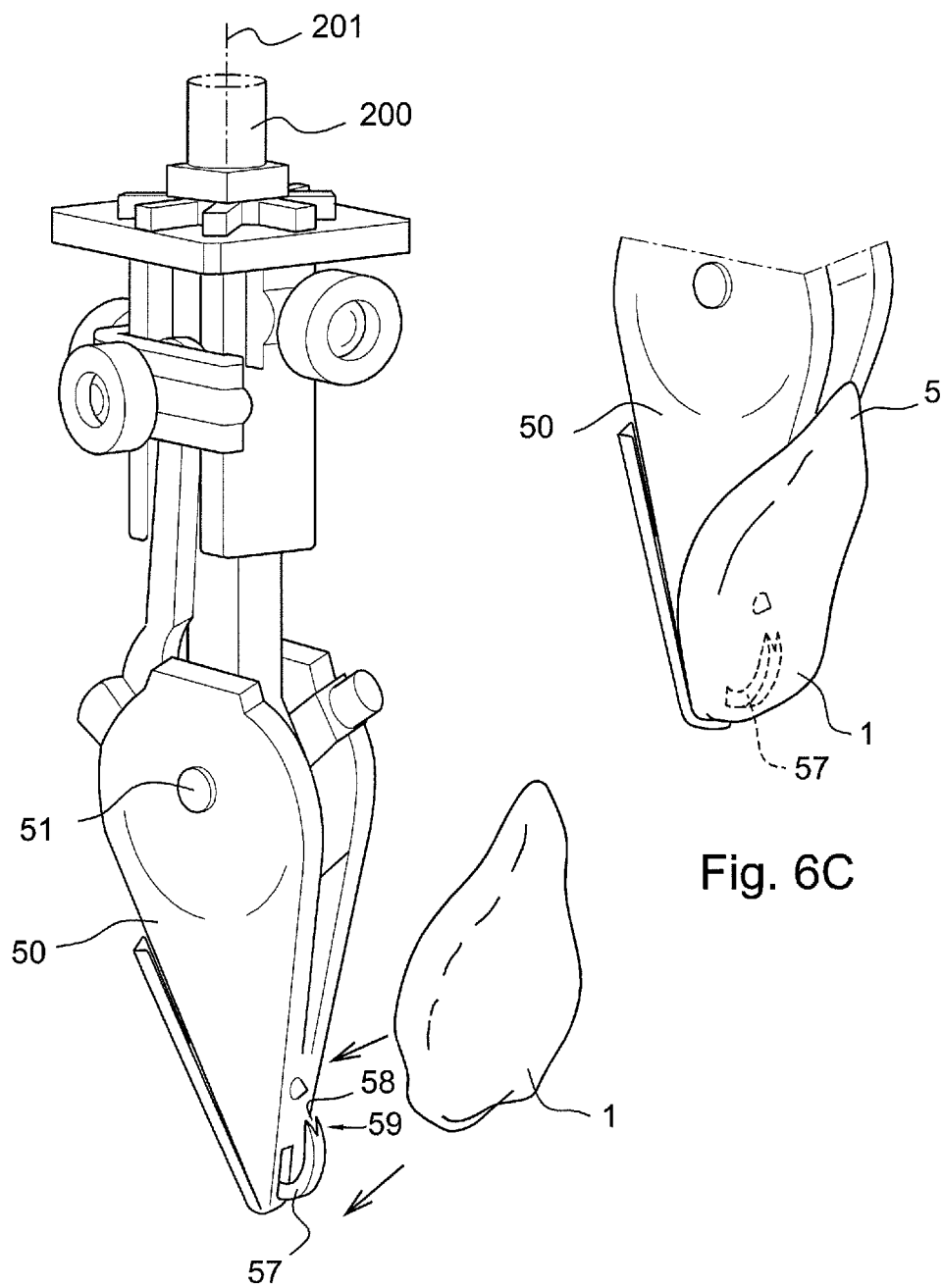
Figure 7:
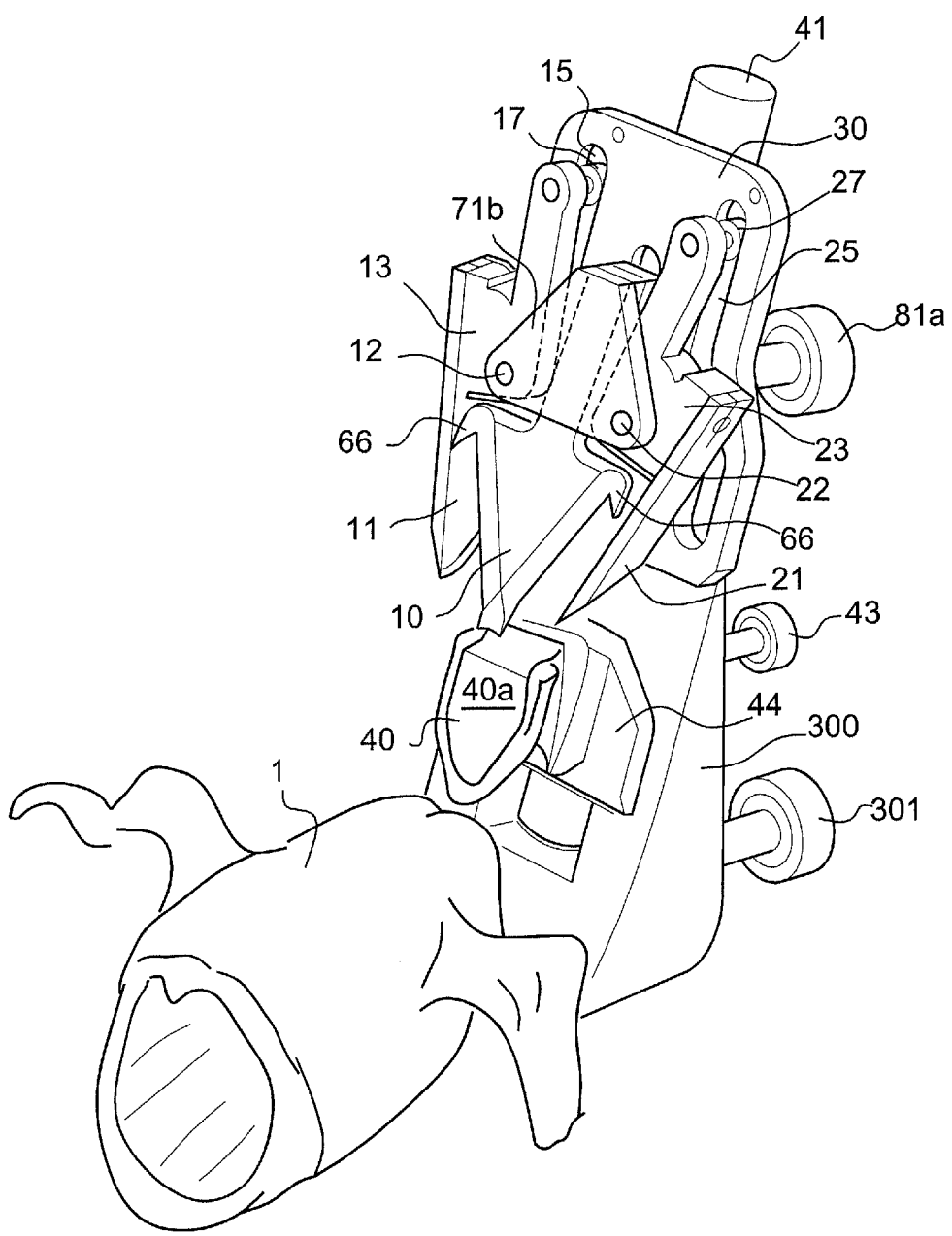
Figure 8:
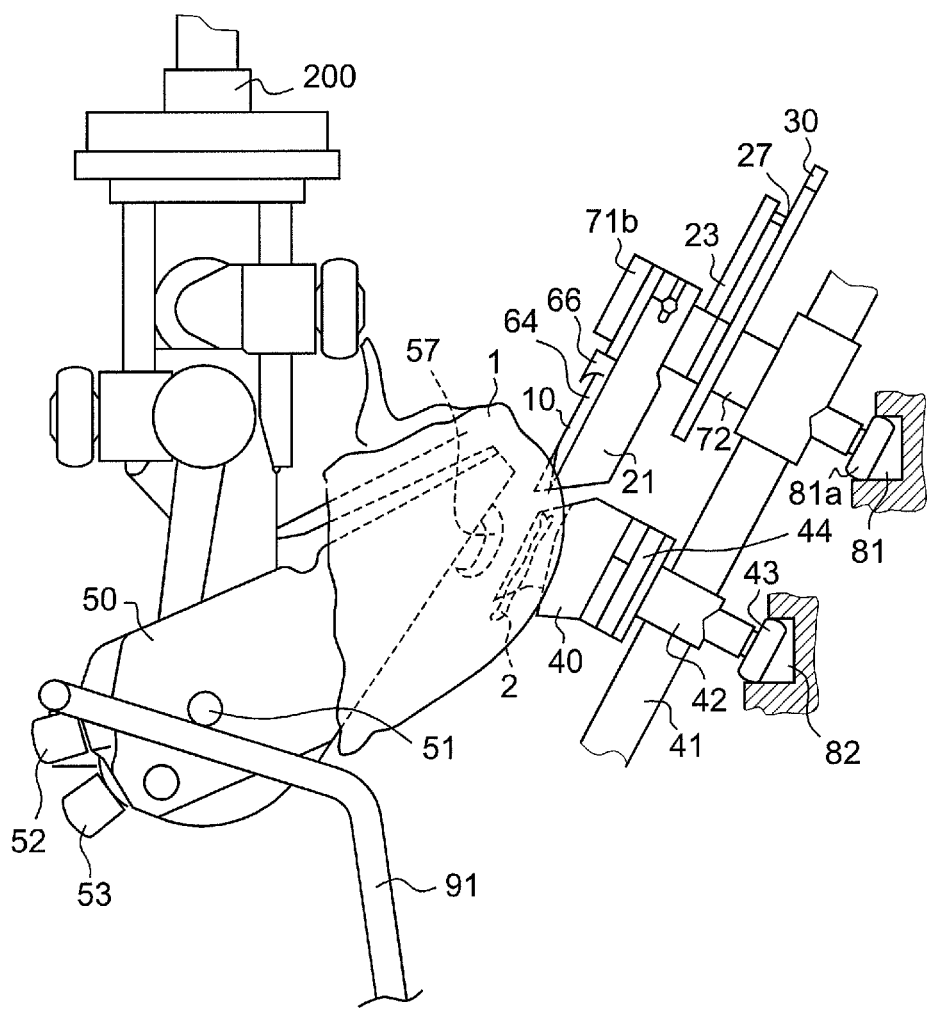
Figure 9:
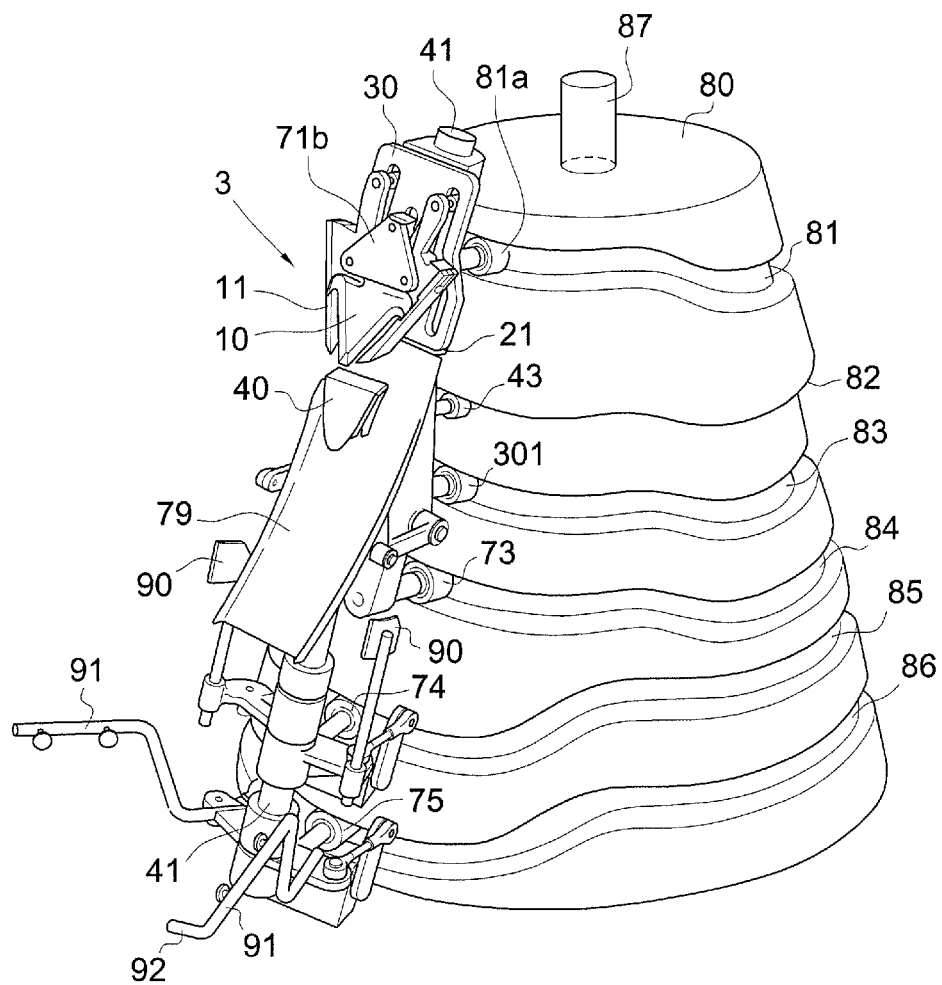
Figure 10:
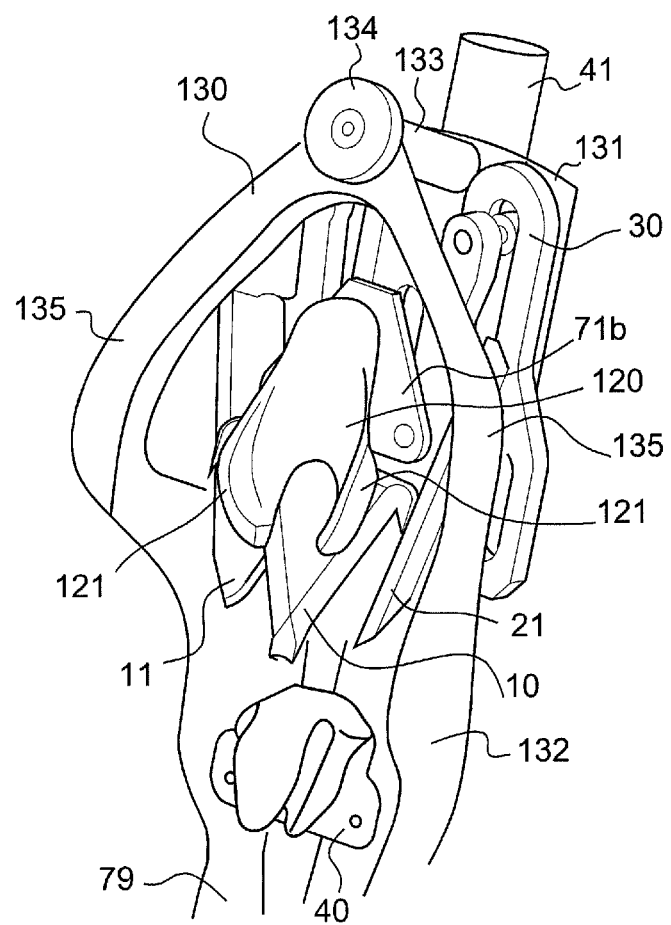
Figure 11:
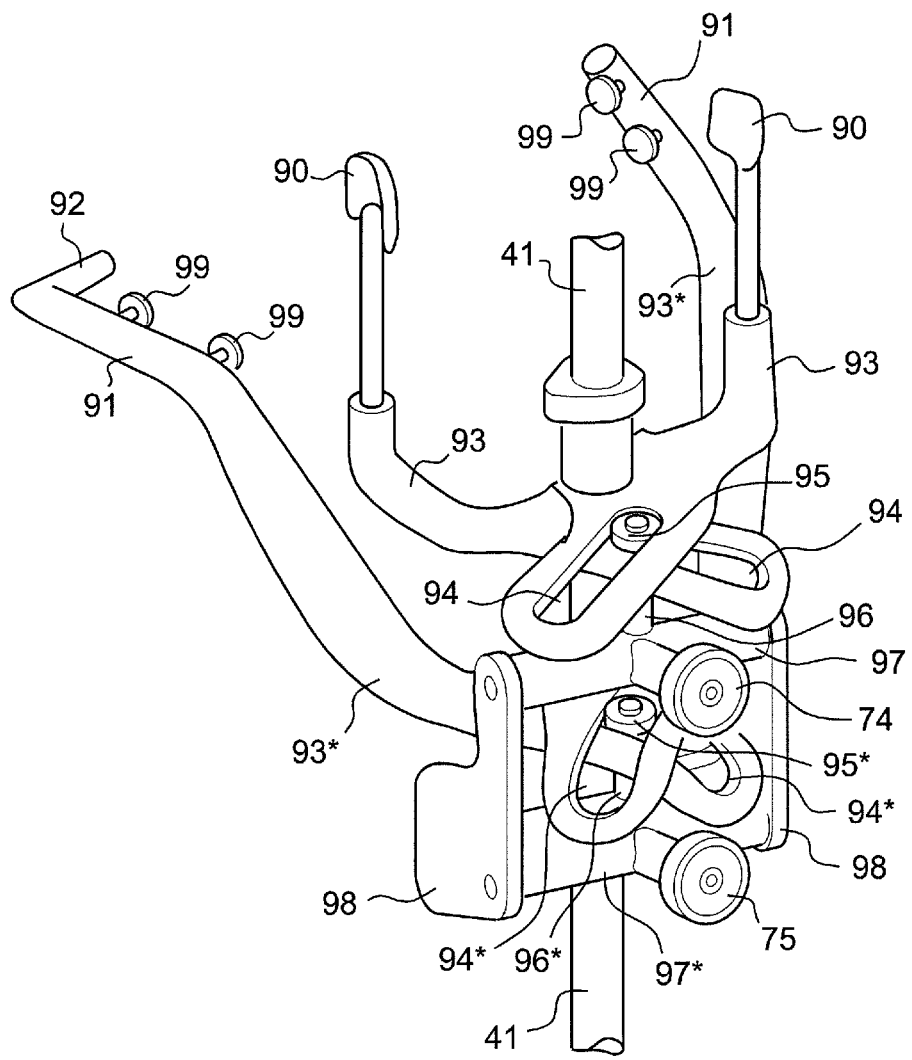
Figure 12:
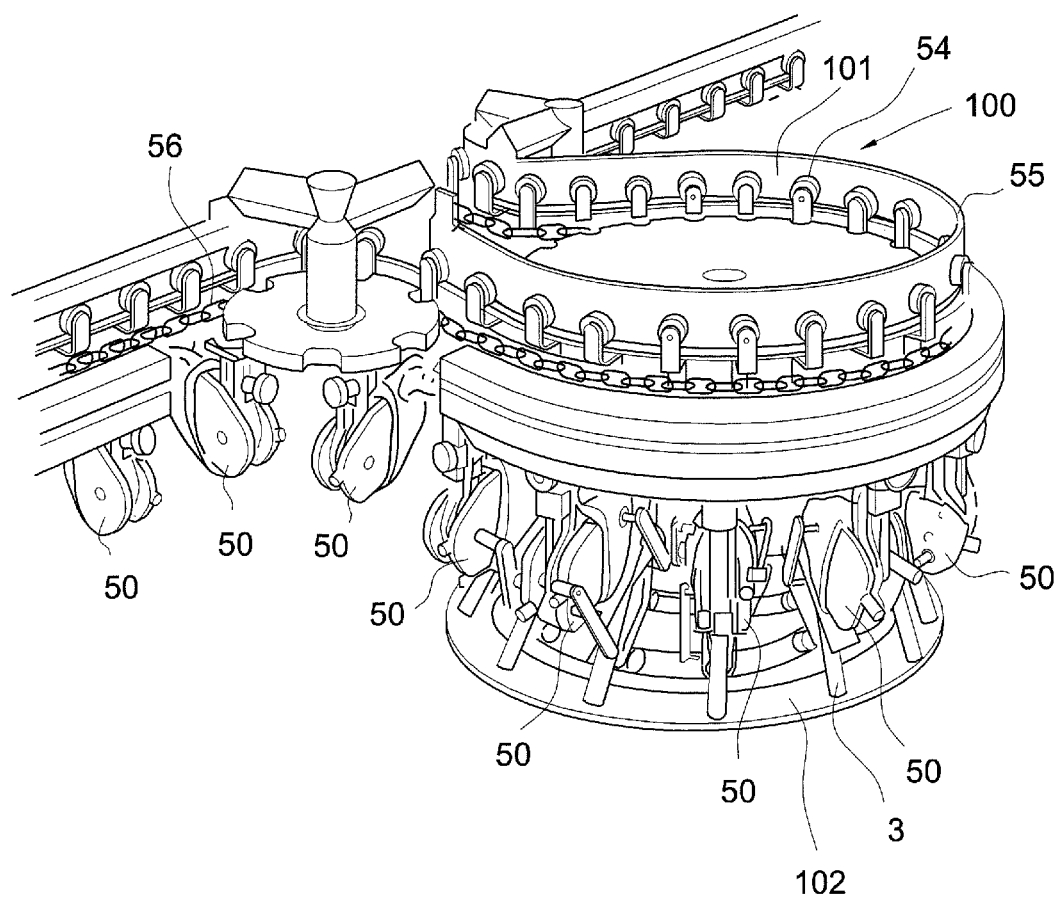
Figure 13:
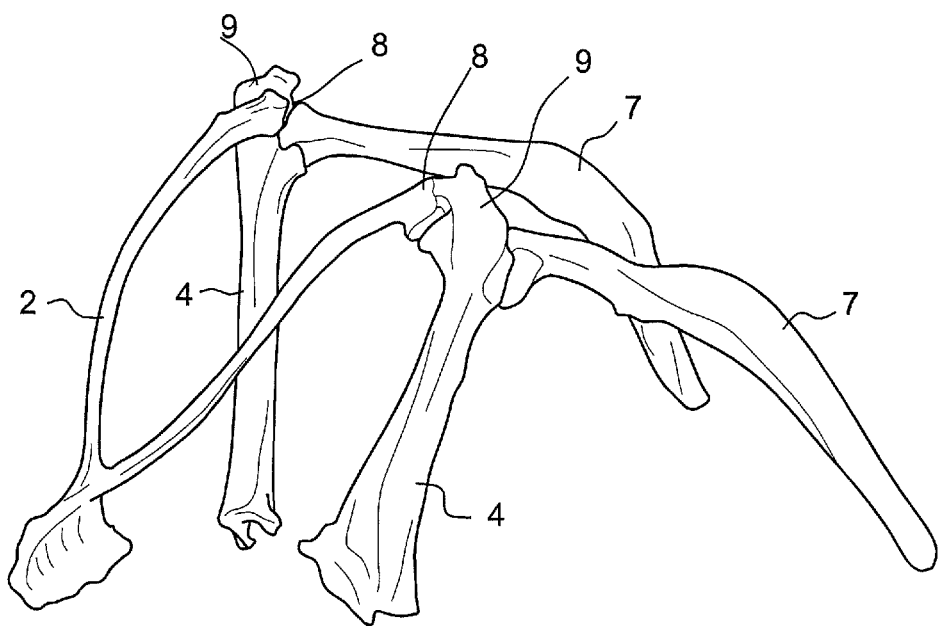
Figure 14:
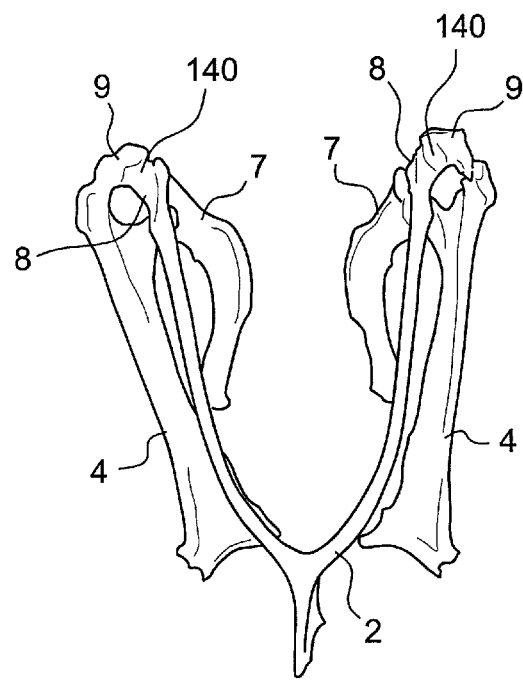
Figure 15A:
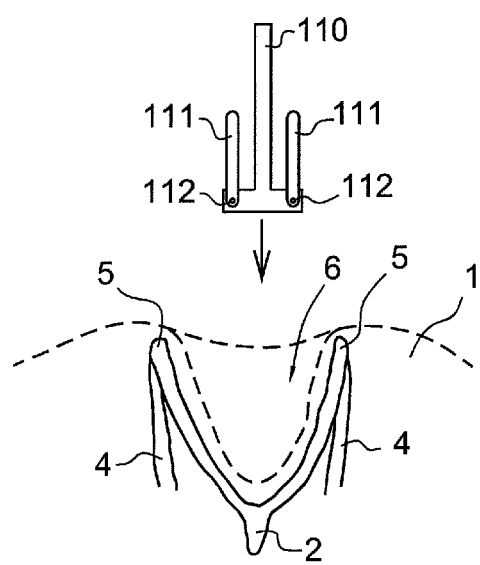
Figure 15B:
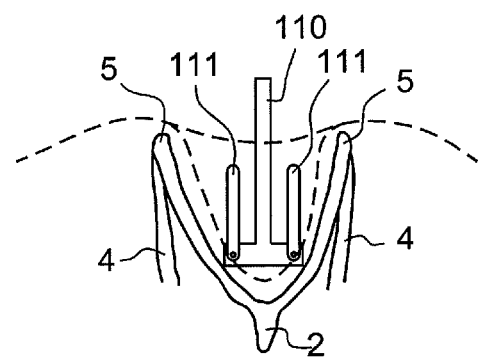
Figure 15C:
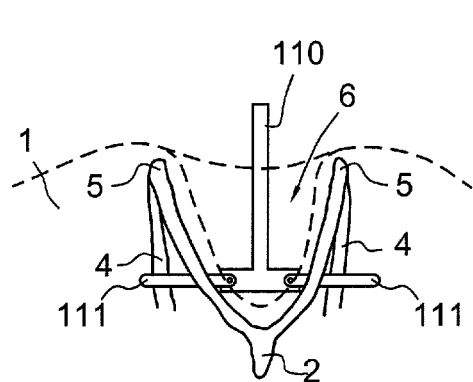
Figure 15D:
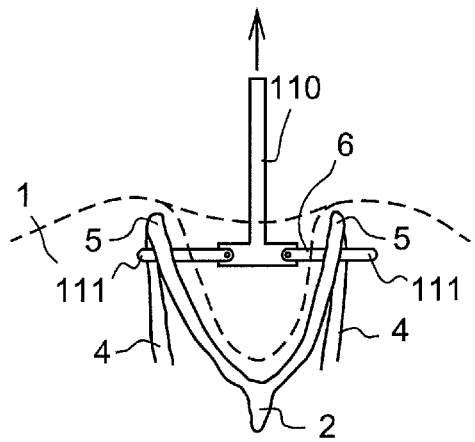
Figure 15E:
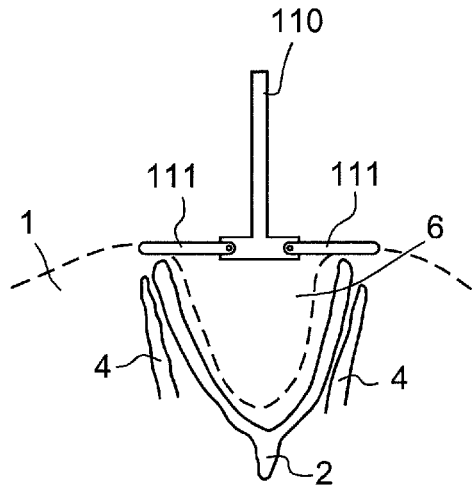
Figure 15F:
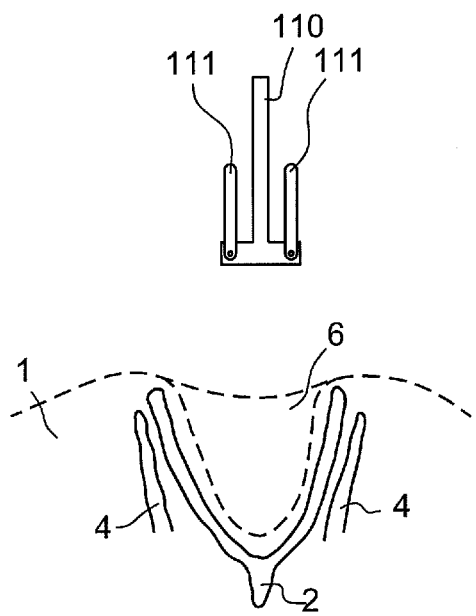
Figure 16:
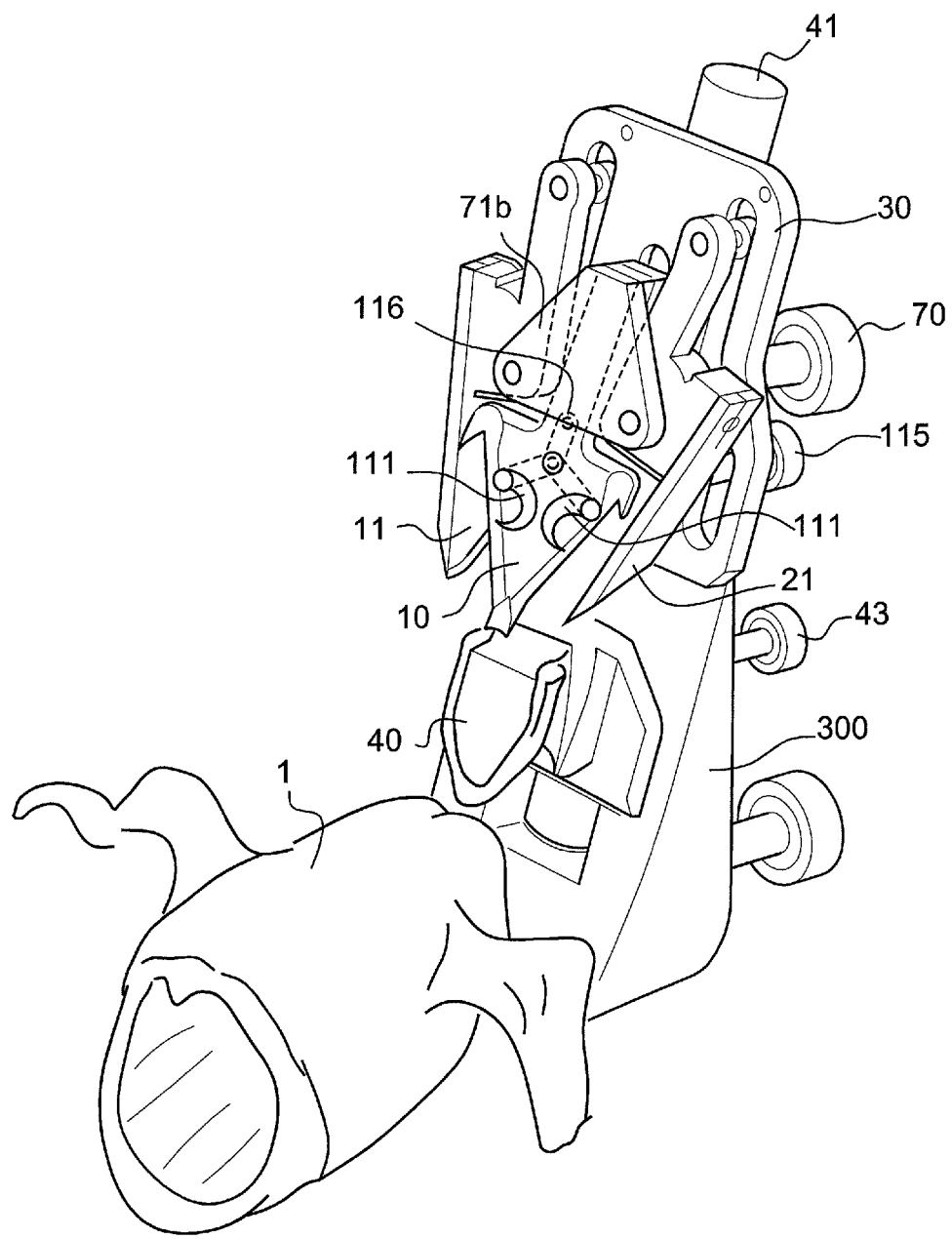
Figure 17A:
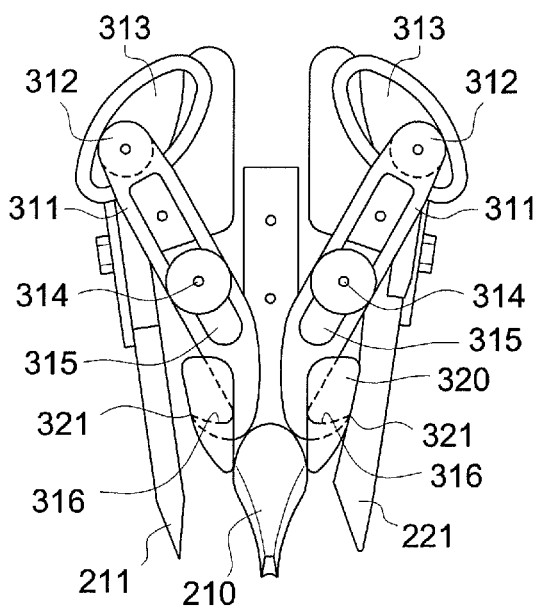
Figure 17B:
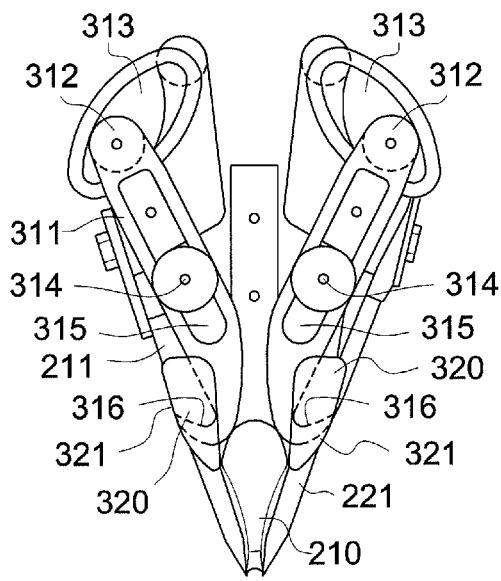
Figure 17C:
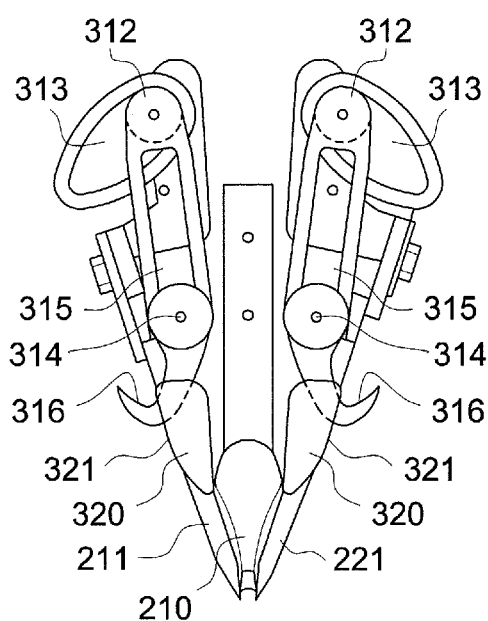
Figure 18:
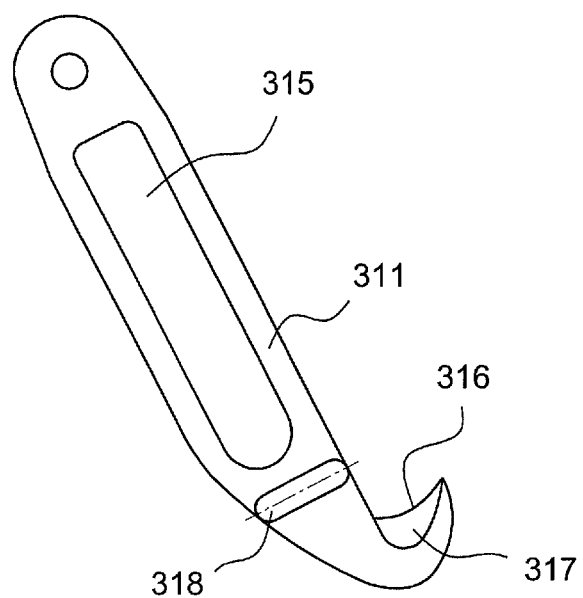

The drawing shows in:

FIG. 1: a schematic outline of a device according to the first aspect of the invention and its operation, FIG. 2: the last part of the secondary cutting paths, and the relative angle between the secondary wishbone knives, FIG. 3: a schematic outline of a first embodiment of the device according to first aspect of the invention, FIG. 4: the embodiment of FIG. 3 in a side view, FIG. 5: an advantageous embodiment of the support block, in cross section, FIGS. 6a1 and 6a2: an advantageous embodiment of the primary wishbone knife, in perspective, FIGS. 6B and C an example of a carcass part carrier that is advantageous to use in combination with the wishbone separation device of the invention, FIG. 7: a second embodiment of the device according to the first aspect of the invention, in perspective, FIG. 8: a second embodiment of the device according to first aspect of the invention, in side view, FIG. 9: an embodiment of a device according to the first aspect of the invention that is mounted on a carrousel, FIG. 10 a further embodiment of the device according to first aspect of the invention, FIG. 11: a suitable embodiment for actuating the carcass part positioners and carrier positioners, FIG. 12: a system for processing carcass parts of slaughtered poultry using a device according to first aspect of the invention, FIGS. 13 and 14: the bones in the neck region of a bird, in this example a hen, FIG. 15: an embodiment of the device and method according to the second aspect of the invention, FIG. 16: a further embodiment of the device according to second aspect of the invention, FIG. 17: a further embodiment of the device according to second aspect of the invention, in different stages of the operational cycle, FIG. 18: a special embodiment of a wishbone joint cutter according to the second aspect of the invention.

FIG. 1 shows a schematic outline of an embodiment of a device according to claim 1 and its operation.

FIG. 1 also shows the wishbone 2 that will be removed from the poultry carcass part. A perspective view of a poultry wishbone is shown in FIG. 14A. The depiction in FIGS. 1 and 2 nearly corresponds to the depiction in FIG. 14.

The wishbone 2 is shown in FIG. 1 in the same position as in FIG. 2, where it is discussed in more detail along with the cutting operations performed near the wishbone to allow for its removal from the carcass part. The rest of the carcass part is not shown in FIG. 1 for reasons of clarity. In general the head and neck of the poultry have been removed, and evisceration has taken place, in prior operations in the slaughtering process. The carcass part may or may not still include wings. Also the carcass part may or may not have been subjected to a skinning operation.

It is preferred that a carcass part carrier is provided in the device to support the carcass part during the relevant operations of the wishbone separating device. Such carriers are known in the art. A preferred embodiment is shown in FIGS. 6A, B.

FIG. 1 shows a primary wishbone knife 10 and two secondary wishbone knives 11, 21.

The primary wishbone knife 10 is generally arrow-shaped in this example, as is preferred, with the narrow or pointed end directed towards the carcass part. As is preferred at least the two lateral and diverging sides of the knife, and preferably also the pointed end, are embodied as cutting edges, e.g. as shown in FIG. 6A where a preferred embodiment is shown.

The secondary wishbone knives 11, 21 are each designed to perform a cutting operation along the outside of a leg of the wishbone 2. In this example each knife 11, 21 has a leading cutting edge directed towards the carcass, e.g. as can be seen in FIGS. 7 and 8.

Also schematically shown is a base 41 of the wishbone separating device, which can be embodied for example as a rectilinear guide, e.g. a rod, e.g. as shown in any of the FIGS. 7-12. For reasons of clarity the base 41 is only indicated (partly) in FIGS. 1E and 1F.

The base 41 movably supports an intermediate member 30, here embodied as a cam plate 30. As is preferred the intermediate member 30 is rectilinearly guided with respect to the base 41 and intermediate member actuating assembly is provided (not shown) to move the intermediate member 30 with respect of the base.

The intermediate basis or cam plate 30, as is preferred, here includes a guide, here a rectilinear guide as is preferred, for the knife 10, here for a carrier and drive member 10a to which the knife 10 is fitted (as is preferred in a replaceable manner, e.g. with one or more bolts). In this example the cam plate 30 is provided with a guide slot 30a in which a portion of the member 10a is slidably received.

As is preferred the axis of guidance of the intermediate member or cam plate 30 with respect to the base 41 is parallel to the axis of guidance of the knife 10 with respect to the intermediate member of cam plate 30.

Each of the secondary wishbone knives 11, 21 is, as is preferred, mounted on an associated secondary wishbone knife support 13, 23, here rigidly yet replaceable mounted thereon as is preferred.

The supports 13, 23 are each pivotably connected to a common coupling and drive member 71a; here depicted by a dashed line for clarity. The supports 13, 23 can rotate about their respective pivoting axis 12, 22 with respect the common member 71a. As is preferred the axis 12, 22 are parallel. As is preferred the axis 12, 22 are spaced apart.

Figure 1B:
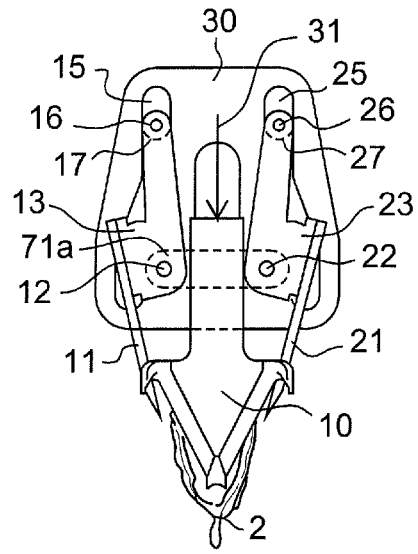
Figure 1C:
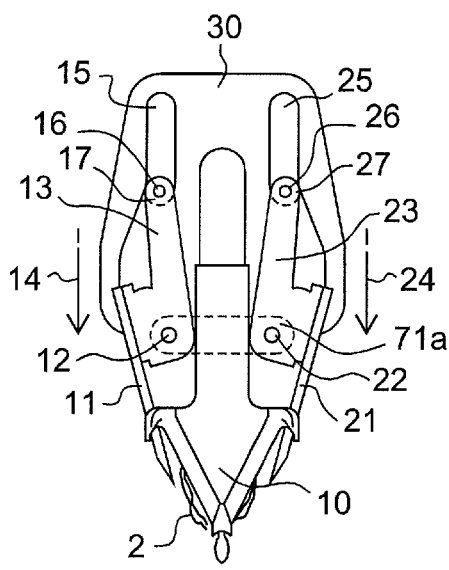
Figure 1D:
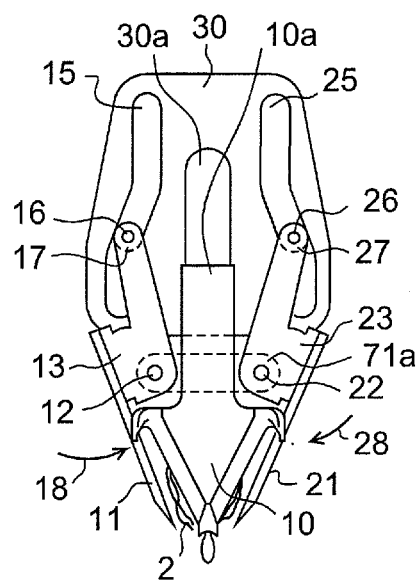
Figure 1E:
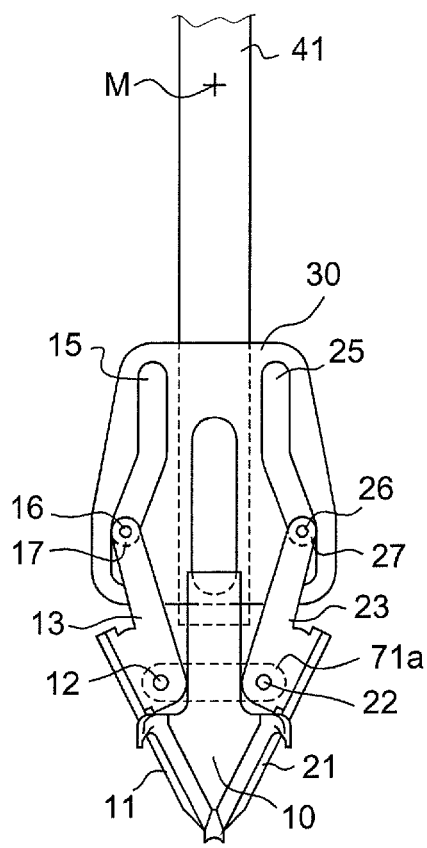
Figure 1F:
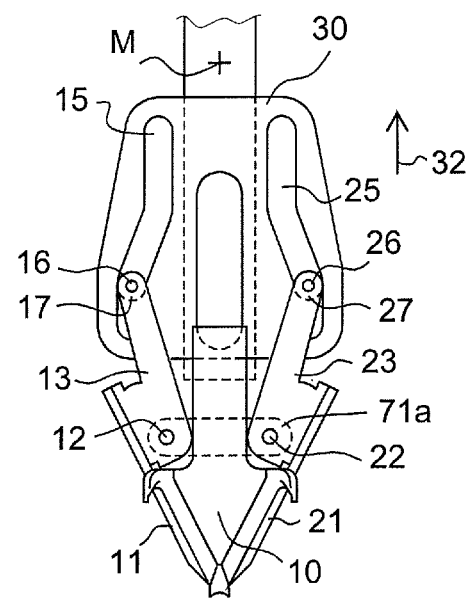
Figure 1G:
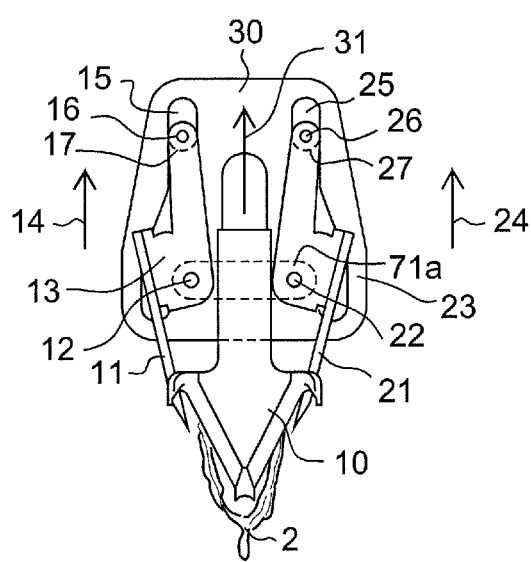
Figure 1H:
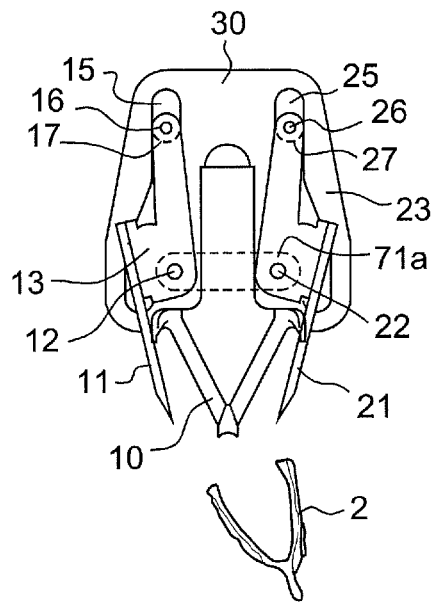
Figure 1I:
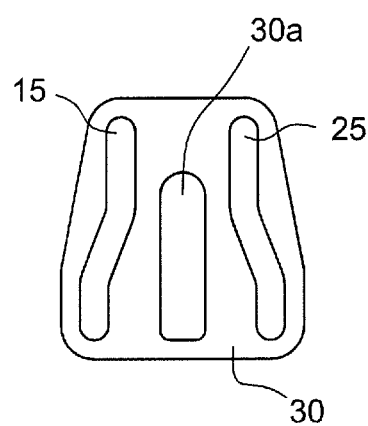

Further, FIG. 1, in particular FIG. 1I, shows the cam plate 30, which is in this example a part of the secondary wishbone knives actuator assembly. As is preferred the cam plate 30 here comprises two cam tracks 15, 25. The supports 13, 23 are each provided with a cam follower 17, 27 that cooperates with a respective cam track 15, 25. The cam followers 17, 27 are arranged at a distance from the associated pivoting axis 12, 22 so as to form a pivot motion actuation arm portion of the support 13, 23 for the respective secondary wishbone knife 11, 21 about the pivoting axis 12, 22.

Preferably, the cam followers 17, 27 are rollers, that are rotatable relative to the supports 13, 23 around the respective roller axis 16, 26. It is however also possible that slides or other structures are used as cam followers 17, 27.

As is preferred the supports 13, 23 also include a secondary wishbone knife support arm portion between the respective pivot axis 12, 22 and the secondary wishbone knife 11, 21. As is preferred pivot motion actuation arm portion and the secondary wishbone knife support arm portion are arranged at an angle with respect to one another, here the supports 13, 23 are each generally L-shaped.

It will be appreciated that the cam tracks 15, 25 and cam followers 17, 27 that cause pivotal motion of the secondary knife supports 13, 23 may be replaced by another actuation assembly that causes controlled pivotal motion of the supports 13, 23, e.g. each support being associated with a respective rotation drive motor, e.g. electric or pneumatic, to cause rotation about pivot axis 12, 22.

For the sake of clarity the FIG. 1 does not show other details of the actuation of the primary and secondary wishbone knives.

In the example shown in FIG. 1 the actuation of the primary wishbone knife performed by a primary wishbone knife actuation assembly that is independent from a secondary wishbone knives actuation assembly allow the primary wishbone knife to be actuated independent from the actuation of the secondary wishbone knives.

In this example it is envisaged that a primary wishbone actuator acts on the knife 10.

For example it is envisaged that the base 41 is moved along a cam track structure of the device (not shown) including at least one cam track governing the motion of the primary knife 10, e.g. a circular cam track for in a carrousel type device or an at least partly linear track when the base 41 is moved along a linear path during operation of the wishbone separation device. For example the carrier 10*a* is provided with a cam follower and the device further includes a cam track cooperating with said cam follower to achieve suitable motion of the knife 10 as the base moves along or relative to said cam track structure. It will be appreciated that another actuator for the knife 10, e.g. a linear drive, such as a cylinder, screw spindle, etc, is also possible.

In this example it is also envisaged that a secondary wishbone actuator acts on the common coupling and drive member 71*a*.

For example it is envisaged that the base 41 is moved along a cam track structure including at least one cam track governing the motion of the secondary knives 11, 21, e.g. a circular cam track for in a carrousel type device or a linear track when the basis is moved along a linear path during its operation. For example the member 71*a* is provided with a cam follower and the device further includes a cam track cooperating with said cam follower to achieve suitable motion of the knives 11, 21 as the base 41 moves along or relative to said cam track structure. It will be appreciated that another actuator for the knives 11, 21, e.g. a linear drive, such as a cylinder, screw spindle, etc, are also possible.

It will be appreciated that when the base 41 is arranged in the device so as to be movable along a cam track structure of the wishbone separating device, or other structure of the device, during operation of the device for removal of the wishbone, a carcass part carrier is also arranged to be movable, e.g. on a suitable conveyor, so that the relevant part of the device and the carcass part remain aligned during the cutting and removal operation of the wishbone.

As will be illustrated in other examples the actuation of the primary knife 10 on the one hand and of the secondary knives 11, 21 may also be mechanically integrated, e.g. a mechanical linkage being provided between the knife 10 and the knives 11, 21, e.g. allowing the motion of both the knife 10 and the knives 11, 21 to be commanded by a single cam track and cam track follower of the device or a single drive motor.

In FIG. 1A, the primary wishbone knife 10 and the secondary wishbone knives 11, 21 are in their respective first or retracted positions, outside the carcass part.

FIG. 1B shows the next phase in removing the wishbone 2 from the carcass part. The primary wishbone knife 10 is moved downwards by a primary wishbone knife actuator assembly (not shown) according to arrow 31. The primary wishbone knife 10 thereby cuts the wishbone 2 loose from meat that is naturally present thereon. At least once the primary wishbone knife reaches the vicinity of the wishbone 2, the cutting takes place adjacent to and in the plane of the wishbone.

As is preferred the secondary knives 11, 21 remain in their retracted position at least during the first part of this motion of the knife 10.

FIG. 1C shows the next phase. Primary wishbone knife 10 has reached its second or fully deployed position, substantially covering or overlying the wishbone 2, seen in the direction perpendicular to the plane of the primary wishbone knife 10. This fully deployed position of knife 10 can be reached before the knives 11, 21 are set in motion, or the motions can overlap in time.

In the phase of FIG. 1C the secondary wishbone knives 11, 21 start their movement from their first or retracted positions towards their second or fully deployed positions, generally in the direction of arrows 14, 24, actuated by the secondary wishbone knives actuator assembly (not shown). In this example said assembly is preferred to act on the member 71*a*.

As indicated the secondary wishbone knife supports 13, 23 are pivotable about their respective pivot axis 12, 22 with respect to the member 71*a*. It will be appreciated that instead of a simple pivot axis a more complex pivoting connection between the knife supports 13, 23 and the member 71*a* is also possible.

A relative motion is caused between the basis or cam plate 30 and the supports 13, 23—here by motion of the member 71*a* under the influence of an associated drive (e.g. a cam track assembly not shown).

Starting from the first or retracted position of the supports 13, 23 with respect to the basis or cam plate 30, it is preferred that the cam tracks 15, 25 have parallel cam track portions, that is parallel to the motion of the pivot axis 12, 22 (here dictated by the member 71*a*), which causes a first part of the deployment motion of the knives 11, 21 to be in a substantially straight line, so without pivoting of the knives 11, 21. This is shown in FIG. 1C.

As can be seen in FIG. 1D adjoining non-parallel portions of the cam tracks 15, 25, that is non-parallel to the motion of the pivot axis 12, 22 (here dictated by the member 71*a*), cause the cam tracks 15, 25 and followers 17, 27 to effect a controlled pivoting of each the secondary wishbone knife supports 13, 23 about their respective pivot axis 12, 22 whilst the knives 11, 21 also move downwards or translate. The pivoting of these knives 11, 21 is such that the leading ends of the knives 11, 21 move generally towards one another, generally so as to follow the side contour the of the legs of wishbone 2.

In FIG. 1D, the followers 17, 27 associated with the secondary wishbone knives are in the non-parallel portions of the cam tracks 15, 25 of the cam plate 30. The cam tracks and followers now pivot the secondary wishbone knives 11, 21 inwardly, according to arrows 18, 28, respectively, in such a way that the path of the secondary wishbone knives 11, 21 substantially follows the outer contour of the legs of wishbone 2.

In the phase shown in FIG. 1E, the secondary wishbone knives 11, 21 have reached their second or deployed position. With both the primary wishbone knife 10 and the secondary wishbone knives 11, 21 in their respective second or deployed positions, the wishbone 2 has been cut loose from the rest of the carcass part and it is ready to be removed there from.

As can be seen in FIG. 1E, and as is preferred, the secondary knives 11, 21 in their fully deployed position are closely or completely together with their leading ends and each have a side that extends, e.g. with some small spacing, alongside a neighboring lateral cutting side, e.g. side 64 of knife 10 in FIG. 6A, of the arrow or triangularly shaped primary knife 10.

The path of each of the knives 10, 11, 21 into the meat of the carcass part is such that the wishbone 2 is intact when the position of FIG. 1E has been reached.

The removal of the wishbone 2 takes place—as is preferred—by moving the primary wishbone knife 10 and the secondary wishbone knives 11, 21 simultaneously away from the carcass part, with the knives 10, 11, 21 in the mutual position shown in FIG. 1E. So at least during a first part of this removal movement, the primary wishbone knife 10 and the secondary wishbone knives 11, 21 are preferably held in the same mutual relative orientation that they had when they all were in their respective second or deployed positions. This is shown in FIG. 1F.

This withdrawal motion of the set of knives 10, 11, 21 in said mutual relative position is achieved in this example—and as is preferred—by motion of the intermediate member or cam plate 30 with respect to the base 41; the knives (with the wishbone held inside the pocket formed by the knives) moving away from the carcass part. To illustrate this motion the same virtual reference point M on the base 41 has been indicated both in FIG. 1E and FIG. 1F. It can be seen—as indicated by arrow 32 in FIG. 1F—that the intermediate member or cam plate 30 has been moved towards said reference point M of the base 41 in FIG. 1F. Any residual connections between the wishbone and the carcass part that would still be present after the cutting actions of the knives 10, 11, 21 is broken by this removal motion.

It will be appreciated that in another embodiment the intermediate member or cam plate 30 need not be mobile with respect to the base 41 to achieve this removal motion. In said embodiment (not shown) the carcass part carrier, when present, could be moved in the opposite direction, or at least in a direction away from the set of knives 10, 11, 21 that retain the wishbone, to effect the removal of the wishbone from the carcass part. A combination of motions of the intermediate member 30 and a carcass part carrier to effect removal of the wishbone is also possible.

When the primary wishbone knife 10 and the secondary wishbone knives 11, 21 are parted from the carcass part over a predetermined distance by means of motion of the cam plate 30, e.g. governed by a cam track mechanism, the knives 10, 11, 21 are actuated so as to move to their first or retracted positions. During this part of the operating cycle, the secondary wishbone knife supports 13, 23 are moved relative to the cam plate 30 by displacement of member 71a, such that the cam followers 17, 27 return to their initial position relative to the cam tracks 15, 25. In this process, the secondary knives 11, 21 spread apart allowing to release the wishbone 2.

In the phase shown in FIG. 1H, the primary wishbone knife 10 and the secondary wishbone knives 11, 21 have returned to their respective first or retracted positions. The wishbone 2 is released as the pocket formed by the knives is now completely open, and is removed from the device, e.g. as it drops under the influence of gravity, e.g. to be received by a collection member, e.g. a chute, of the device.

A wishbone ejector member, preferably a mechanical ejector member, may be provided to assists in ejection of the wishbone from the set of knives, e.g. when it is envisaged that a wishbone may stick or cling to the set of knives. A mechanical ejector member can be associated with a dedicated cam track and cam follower mechanism to achieve timed operation of the ejector member.

FIGS. 2A, 2B, 2C and 2D shows a part of possible secondary cutting paths 19, 29 of the secondary wishbone knives 11, 21. As can clearly be seen from these figures, the secondary cutting paths 19, 29 are curved and they follow at least substantially the outer contour of the legs of the wishbone 2. For reasons of clarity, the primary wishbone knife 10 is not shown in FIGS. 2A, 2B, 2C and 2D.

The wishbone comprises two legs 2a, 2b, that meet at the tip of the wishbone, and a protruding bone plate 2c. The bone plate has a free end 2d.

Figure 2A:
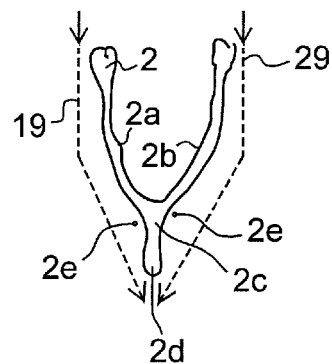

In the example of FIG. 2A, the secondary paths are made up of straight lines, with relatively sharp bends where the changes in direction take place. In the example of FIG. 2A, the secondary cutting paths 19, 29 run in a straight line from the wide part of the wishbone to the free end 2d of the bone plate 2c. This means that some meat or other tissue will remain attached to the wishbone in the area 2e. The advantage of the secondary cutting paths 19, 29 as shown in FIG. 2A is however that they are of a simple shape that is easy to impose on the secondary wishbone knives by means of hardware. And even with the secondary cutting paths as shown in FIG. 2A, less meat remains attached to the wishbone than when the device that is known from EP1430780 is applied.

Figure 2B:
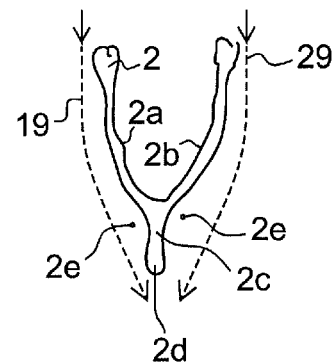

FIG. 2B shows an alternative shape of the secondary cutting paths 19, 29. In this alternative, the secondary cutting paths 19, 29 are made up of curves. Like in the secondary cutting paths of FIG. 2A, the secondary cutting paths of FIG. 2B allow some tissue to remain attached to the wishbone in the areas 2e. The advantage of the secondary cutting paths 19, 29 as shown in FIG. 2B is again that they are of a simple shape that is easy to impose on the secondary wishbone knives by means of hardware. And also with the secondary cutting paths as shown in FIG. 2B, less meat remains attached to the wishbone than when the device that is known from EP1430780 is applied.

It will be clear to the skilled person that in a variation of the secondary cutting paths of FIGS. 2A and 2B, secondary cutting paths can be used that are a combination of straight lines and curves.

Figure 2C:
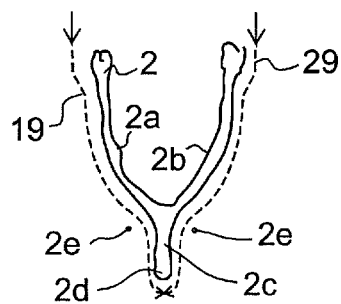

FIG. 2C shows a further alternative shape of the secondary cutting paths 19, 29. In this example, the secondary cutting paths 19, 29 closely follow the outer contour of the wishbone, also in the areas 2e. This results in a more complex shape of the secondary cutting paths 19, 29, but in a very efficient separation between meat and wishbone. In FIG. 2C, the secondary cutting paths 19, 29 are made up by a combination of straight lines and curves.

Figure 2D:
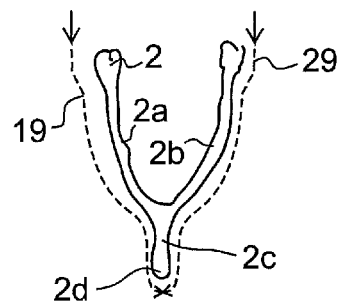

FIG. 2D shows a further alternative shape of the secondary cutting paths 19, 29. In this example, the secondary cutting paths 19, 29 closely follow the outer contour of the wishbone, also in the areas 2e. This results in a more complex shape of the secondary cutting paths 19, 29, but in a very efficient separation between meat and wishbone. In FIG. 2D, the secondary cutting paths 19, 29 are made up by a combination of straight lines.

In the secondary cutting paths 19, 29 of FIGS. 2C and 2D, it is possible that the secondary wishbone knives scrape along the sides of the bone plate 2c in order to separate the meat from the bone plate.

In all secondary cutting paths 19, 29 shown in FIG. 2, the secondary cutting paths 19, 29 meet each other adjacent to the free end 2d of the bone plate 2c. This is advantageous, because it helps to completely separate the wishbone from the rest of the carcass part. At the free end 2d of the bone plate 2c, quite some tissue such as tendons and membranes are present. Making the secondary wishbone knives meet each other in this area helps to cut through these tissues effectively. For example, the movement of the secondary wishbone knives can be controlled to make them carry out a scissor-like action together.

FIG. 3 shows a schematic outline of parts of an advantageous embodiment of the wishbone separation device. In this embodiment, a wishbone support block 40 has been additionally provided, as well as an associated wishbone support block actuator assembly (not shown), preferably an actuator assembly that is independent from the one or more actuation assemblies of the knives 10, 11, 21. For example, e.g. as is shown in FIG. 8, a cam track and cam follower assembly is associated with the support block 40 to effect the motion thereof between a retracted position and a deployed position.

The support block 40 is arranged behind the primary wishbone knife 10. For reasons of clarity, the primary wishbone knife 10 is not shown in FIG. 3.

FIG. 3A shows the support block 40 in its first or retracted position. In this position, it is outside the carcass part to be processed. In general it is under the knife 10 when said knife 10 is in its retracted position.

FIG. 3B shows the support block 40 in its second or deployed position. In this second position, the support block 40 supports the wishbone 2. In general the support block 40 is then arranged in the space between the legs 2a, 2b of the wishbone 2. In its second position, the support block 40 helps the wishbone to withstand forces that result from cutting actions by one or more of the knives 10, 11, 21 in the neighbouring meat.

The support block 40 can have a recess for at least partly receiving the wishbone, e.g. a recess at each lateral side of the block for a leg of the wishbone, or for a part of such a leg.

It is preferred for the wishbone support block 40 to be brought in its second or deployed position between the legs of a wishbone that has to be removed from a carcass part prior to the activation of the wishbone separating knives, e.g. as explained with reference to FIG. 1.

In such an approach the primary wishbone knife 10 is moved downward into the carcass part from its first to its second position after the block 40 has been deployed. During this movement, the primary wishbone knife 10 preferably moves along a front face of the support block 40 to cut meat loose from the wishbone in a plane that is substantially parallel to the plane of the wishbone.

The secondary wishbone knives 11, 21 are made to pass a distance outside of the lateral sides of the support block 40.

If use is made of a wishbone support block 40, and if the wishbone 2 is being removed from the carcass in the manner as explained in view of FIG. 1F-1H, the support block 40 is made to move along with the primary wishbone knife and the secondary wishbone knives away from the carcass. This causes the wishbone to be held in a pocket defined on the outside by the knives 10, 11 and 12, and on the inside by the support block 40.

FIG. 4 shows parts of the embodiment of FIG. 3 in a side view. In FIG. 4, the support block 40, the primary wishbone knife 10 and the secondary wishbone knives 11, 21 are all in their respective second or deployed positions.

The support block 40 is arranged between the legs of the wishbone 2. In this example, the front side 40a of the support block 40 has a planar face. The primary wishbone knife 10 which—as is preferred—is planar on the side facing the support block slides over or is moved parallel and adjacent to the front side of the support block 40.

The support block 40 is connected to a support block actuator assembly. In this example, the support block actuator assembly comprises a connection element 44, which connects the support block 40 with a slide 42. Slide 42 is guided with respect to the base of guide 41, here—as is preferred can be moved rectilinear along the base or guide 41. A cam follower 43 is connected to the slide 42. Cam follower 43 runs over a cam track (not shown) of the device in order to move the slide 42, and therewith the support block 40 between its first and second positions (as indicated by arrow 45).

The base or guide 41 can have any suitable design, e.g. as a single rod or column of any suitable cross sectional shape. The base or guide 41 can be designed such that rotation of parts of the device that are guided thereby around the base or guide 41 is prevented. On the other hand, if a guide 41 e.g. with a circular cross section is used, additional measures have to be taken in order to prevent that these parts of the device could rotate around the guide 41. This can be done for example by providing a key in the guide 41.

In FIG. 4 an advantageous embodiment of the secondary wishbone knives 11, 21 is shown. In this embodiment, the leading cutting edge of each of the secondary wishbone knives 11, 21 has a slanting or inclined part 21*, like a corner has been trimmed off a rectangular knife body. This results in a tapered form of the cutting edge in the plane of the knife 11, 21. Seen in side view the knives 11, 21 then each have a leading tip at side near the primary knife 10. The effect of this tapering is that there is less risk that the breast fillets are damaged by the secondary wishbone knives 11, 21 during the process of separating the wishbone.

When use is made of a wishbone support block 40 an issue may lie in the efficient removal of the wishbone, as a wishbone may tend to stick or cling to the support block 40 once the knives 10, 11, 21 have been moved to their retracted position, so that the wishbone is not released. It is possible to use compressed air that blows the wishbone off the support block 40, but this results in a complicated structure of the device. Therefore it is proposed here to provide the support block 40 with at least one mechanical ejector member, that is movable with respect to the support block and pushes the wishbone from the support block. As is preferred the mechanical ejector member is actuated by means of a dedicated cam track and cam follower assembly.

FIG. 5 shows an advantageous embodiment of the wishbone support block 40, in cross section. In this embodiment, the support block is provided with a cavity 46 therein. The outer contour of the support block 40 is not affected by this cavity 46 at least in the area where the support block 40 engages the wishbone 2.

The support block 40 is in this embodiment provided with an ejector arm 47 that extends into the recess 46. The ejector arm 47 is rotatable about axis 48. The rotation of the arm 47 is controlled by means of a cam track (not shown) in combination with a cam follower 49, which is connected to the arm 47. Arm 47 has a face 47*.

When the support block 40 is moved from its first position outside the carcass part to its second position inside the carcass part, the arm 47 has such a position relative to the support block 40 that preferably the operative face 47* is either retracted within the cavity 46 or lies substantially flush with the outer contour of the support block 40.

When the primary wishbone knife 10, the secondary wishbone knives 11, 21 and the support block 40 are moved away from the carcass in the process of removal of a wishbone, the wishbone 2 is retained in a pocket formed by these knives. In order to release the wishbone preferably first the secondary wishbone knives 11, 21 and preferably later also the primary wishbone knife 10 are moved to their retracted position. Often, the wishbone 2 then still clings to the support block 40, so it has to be removed from the support block 40 actively.

In the support block 40 of FIG. 5, the ejector arm, here the front face 47* of the arm 47, is used to push the wishbone off the support block 40. When the secondary wishbone knives are in a position relative to the support block 40 that allows the wishbone 2 to be pushed away from the support block 40, a cam track actuates the arm 47 via cam follower 49 to pivot around axis 48. Due to this actuation, the front face 47* is moved such that is comes to project from the outer contour of the support block 40. Thereby it engages the wishbone 2 and pushes the wishbone 2 off the support block 40.

FIGS. 6A1 and 6A2 show an advantageous embodiment of the primary wishbone knife 10, in perspective.

The cutting portion of the body 63 of the primary wishbone knife 10 is generally arrow or triangularly shaped, with the tip of the arrow being the first part of the primary wishbone knife 10 that is introduced into the carcass part. The body of the primary wishbone knife has a mounting portion 61, with one or more openings 62 in which fastening means such as bolts can be arranged to attach the primary wishbone knife 10 to the primary wishbone knife actuator assembly, e.g. to carrier 10a.

In the advantageous embodiment of FIG. 6, the primary wishbone knife 10 is provided with facets 64 along the lateral sides of the arrow or triangularly shaped cutting portion of the body. These facets help to reduce the risk of damaging the breast fillet while cutting loose the wishbone.

As can be seen in FIG. 6, and as is preferred, the tip 65 of the primary wishbone knife 10 is gouge-shaped. Alternatively, the tip can be forked. The wishbone is connected to the sternum of the carcass part by means of a tendon. The gouge-shape or fork-shape of the tip end of the knife 10 is helpful in cutting through this tendon reliably, as these shapes prevent the tendon from sliding over, off and/or away from the primary wishbone knife 10.

As is preferred, the primary wishbone knife 10 has at its wide side of the arrow or triangularly shaped cutting portion two curved wings 66, each wing 66 at the end remote from the tip 65 of a lateral side of the cutting portion. These wings 66 project outwardly from the plane of the body 63 of the primary wishbone knife 10. In use, the primary wishbone knife 10 is arranged such that the wings 66 point in a direction away from and substantially perpendicular to the front face of the support block 40 (if a support block is used), so towards the side of the breast fillet of the carcass part.

The wings 66 help to reduce the risk of damaging the breast fillet while cutting loose the wishbone. Furthermore, the curved shape of the wings at the side facing away from the tip 65 helps to prevent the primary wishbone knife 10 getting jammed in or though the wishbone joints when the primary wishbone knife 10 is retracted from its second position to its first position.

FIG. 6B and FIG. 6C show an example of a product carrier 50 that is advantageous to use in combination with the wishbone separation device described herein, in particular in combination with this embodiment of FIG. 6A of the primary wishbone knife. This product carrier 50 is provided with a movable hook 57 for fixing the carcass part 1 to be processed onto the product carrier 50. The hook 57 is adapted to engage the carcass part 1 by the sternum.

The hook 57 is provided with a slit 58 at its tip, which causes the hook 57 to have a forked tip 59. When a carcass part 1 is arranged on the product carrier 50 of FIG. 6A and FIG. 6B, the tendon attaching the wishbone to the sternum is caught in the slit 58 of the hook 57. This way, the tendon that attaches the wishbone to sternum is held in place while it is cut through by the primary wishbone knife.

When the embodiment of the primary wishbone knife 10 according to FIG. 6A is used, the tendon connecting the wishbone to the sternum gets caught between the forked or gouge-shaped tip 65 of the primary wishbone knife 10 and the forked tip 58 of the hook 57 of the product carrier 50. This way, the cutting through of the tendon is carried out in a reliable way.

FIGS. 7 and 8 show a second embodiment of the device according to the first aspect of the invention. In this embodiment, the primary wishbone knife 10 and the secondary wishbone knives 11,21 are mechanically coupled to each other, here by a coupler plate 71b, so as to allow for a single common actuation assembly for all knives 10, 11, 21. This in contrast to the embodiment with independent actuation assemblies for the knife 10 and the knives 11, 21 as has been explained with reference to FIG. 1.

The primary wishbone knife 10 is stationary connected to the coupler plate 71, for example by means of bolts, screws or by welding.

The secondary wishbone knife supports 13, 23 are connected to the coupler plate 71b by their respective pivot axes 12, 22. So, the secondary wishbone knife supports 13, 23 are pivotable relative to the coupler plate 71b and to the primary wishbone knife 10.

A connection element 72, e.g. integral with a knife carrier 10a, connects the coupler plate 71b and therewith the primary wishbone knife 10 and the secondary wishbone knives 11, 21 to a cam follower 81a. The cam follower 81a cooperates with a cam track 81. This allows to move the assembly of knives 10, 11, 21 and supports 13, 23 with respect to the cam plate 30. As the coupler plate 71b is moved relative to the cam plate 30, the cam followers 17, 27 move in the cam tracks 15, 25 and the desired pivotal motion of the knives 11, 21 is achieved.

In this embodiment, the cam plate 30 is mounted movable on the base or guide 41. The cam plate 30 is fitted on a bracket 300, that is rectilinear sliding along the guide 41. the bracket 300 is not shown in FIG. 8. A cam follower 301 is associated with the bracket 300, and the device has a corresponding cam track (not shown) for said cam follower 301 to allow for controlled motion of the cam plate 30 with respect to the guide or base 41.

The FIGS. 7 and 8 also shown the optional wishbone support block 40. The support block 40 is mounted on connection element 44, which connects the support block 40 to a cam follower 43. The support block 40, connection element 44 and cam follower 43 are movable along guide 41. In this example, guide 41 that is used for guiding the support block 44 is the same as the guide 41 that is used for guiding the coupler plate 71b with the primary wishbone knife and the secondary wishbone knives. However, it is also possible that separate guides are used. The movements of the support block 40, connecting element 44 and cam follower 43 are prescribed by a cam track 82 through or along which the cam follower runs.

FIG. 7 shows the situation in which the primary wishbone knife 10, the secondary wishbone knives 11,21 and the support block 40 all are in their respective first or retracted positions, outside carcass part 1. Like in the other embodiments shown, this can be regarded as the start position of an operational cycle.

Starting from the position shown in FIG. 7, first the support block 40 is moved to its second or deployed position, inside the carcass part 1, between the legs of the wishbone. This movement is actuated by the cam follower 43 and its associated cam track 82. FIG. 8 shows the support block 40 in its second or deployed position.

Then, the cam follower 81a and its associated cam track 81 make the coupler plate 71b—with the primary wishbone knife 10 and the secondary wishbone knives connected to it—move to the respective second or deployed positions of the primary wishbone knife 10 and the secondary wishbone knives 11,21. During this movement of the coupler plate 71, the cam plate 30 is not moved in the direction of the cutting paths. This makes that a relative movement between the couple plate 71b and the cam plate 30 takes place, which makes the cam followers 17, 27 of the secondary wishbone knives 11, 21 move through the cam tracks 15, 25 of the cam plate 30. This movement of the cam followers 17, 27 makes the secondary wishbone knife support 13, 23 to pivot about their respective pivot axes 12, 22. So, the movement of each of the secondary wishbone knives 11, 21 from the first to the second position is a combination of a translation and a rotation. The translation is prescribed by the movement of the coupler plate 71b and the rotation is prescribed by the cam tracks 15, 25 and the cam followers 17, 27.

The movement of the coupler plate 71b can take place after the support block 40 has reached its second or deployed position, but it can also overlap with the motion of the support block. In that case, the movement of the support block 40 from its first to its second position and the movement of the coupler plate take place simultaneously at least for a part of said movements.

In FIG. 8, the primary and secondary wishbone knives are on their way to their respective second positions, but they have not reached them yet.

When the support block and the primary and secondary wishbone knives all have reached their second or deployed positions, the wishbone knives have separated the wishbone from the surrounding meat, such that the wishbone is no longer connected in any substantial manner to the rest of the carcass part 1. With the support block and the primary and secondary wishbone knives all in their second positions, the now loose wishbone is trapped between the support block 40 and the primary and secondary wishbone knives 10, 11, 21.

In order to remove the wishbone from the carcass part, the support block, the primary wishbone knife and the secondary wishbone knives move upward from their respective second positions in the direction of their respective first positions together while maintaining their relative positions with respect to each other. As they trap the now loose wishbone between them, they take the wishbone along with them in the direction of their first positions, so away from the carcass part 1.

When the support block, the primary wishbone knife and the secondary wishbone knives are sufficiently parted from the carcass part, they change their relative positions again in order to release the wishbone. The movements of the support block, the primary wishbone knife and the secondary wishbone knives end when they have reached their respective first positions again. This concludes the operational cycle.

The skilled person will understand that the removal of the loose wishbone from the carcass part as described above—trapped between the support block, the primary wishbone knife and the secondary wishbone knives—can be used in combination with different embodiments of the device according to the first aspect of the invention as well.

FIG. 9 shows an embodiment of a wishbone separation device 3 according to the first aspect of the invention that is mounted on a carrousel. For clarity's sake, only one device 3 is shown in FIG. 9. The skilled person will understand that advantageously, a plurality of devices 3 according to the invention is mounted on the carrousel.

The carrousel comprises a drum 80, that is mounted in a frame (not shown). The devices 3 are moveable relative to the drum 80. In general, the drum will be stationary mounted, e.g. on shaft 87, while the devices 3 move in a closed circular path around the drum 80, with the centre of the drum, here the shaft 87, as the centre of their path.

Drum 80 has been provided with one or more cam tracks 81, 82, 83, 84, 85, 86. These cam tracks are used to prescribe movements of various part of the device 3. The cam tracks can be double-sided, as in this example are the cam tracks 81, 82, 84, 85 and 86. This means they have an upper surface and a lower surface that can be engaged by the associated cam follower. Cam track 83 in this example is single-sided. It has only one surface on which the cam follower runs. The skilled person will understand that all cam tracks can be either double-sided or single sided, depending on the movements to be carried out.

In the embodiment shown in FIG. 9, cam track 81 controls the movements of the coupler plate 71b, which has the primary wishbone knife 10 and the secondary wishbone knife supports 13, 23 with knives 11, 21 connected thereto in this example. The secondary wishbone knife supports 13, 23 are pivotable relative to the coupler plate 71b.

The cam track 81 prescribes the upward and downward movements of the coupler plate 71b with the primary wishbone knife 10 and the secondary wishbone knives 11, 21. The cam follower 81a transfers the prescribed movement to the coupler plate 71b. The cam track 81 and the cam follower 81a make that the primary wishbone knife 10 follows the primary cutting path from the primary wishbone knife's first position to its second position and vice versa. The cam track 81 and the cam follower 81a also prescribe the translatory component of the movement of the secondary wishbone knives 11, 21 along their respective secondary cutting paths. Furthermore, due to the action of the cam track 81 and the cam follower 81a, relative movement between the cam plate 30 and the cam followers 17, 27 of the secondary wishbone knives 11,21 is created, which results in the pivotal component of the secondary wishbone knives 11, 21 such that their respective secondary cutting paths are prescribed.

FIG. 9 also shows cam follower 43, that together with cam track 82 prescribes the movements of the support block 40 from the support block's first position to its second position and vice versa.

The cam follower 301 cooperates with cam track 83 and governs the motion of the bracket 300 and cam plate 30 with respect to base or guide 41.

The embodiment of the device 3 according to the first aspect of the invention as shown in FIG. 9 is provided with a chute 79. Wishbones that are removed from the support block 40, for example by the action of arm 47 or under the influence of gravity, fall upon the chute 79, which leads them away from the device 3. The aim of the chute 79 is to prevent wishbones from getting caught between the moving parts of the device 3 or of adjacent systems or parts thereof.

The other cam tracks 84, 85, 86, with their respective associated cam followers 73, 74, 75 are used for actuating other moving parts of the device 3. In the embodiment of FIG. 9, cam track 84 and its associated cam follower 73 are used for actuating wishbone joint cutters (not shown in further detail).

Cam track 85 and cam follower 74 operate one or more optional carcass part positioners 90 of the wishbone separation device. These carcass part positioners 90 are mounted on the base 41 of the device and are adapted to position the carcass part that is to be processed by wishbone separation device 3 relative to this device 3. The carcass part positioners 90 have a retracted and operative position. In FIG. 9, they are shown in FIG. 9 in their retracted position. When a carcass part is arranged in front of the device 3, for example by a product carrier of a transport system, the carcass part positioners 90 are moved into their operative position, in which they engage on the outside of the carcass part at opposed locations. By doing so, they bring the carcass part in a good position for being processed by the device 3.

The carcass parts that are to be processed are preferably carried by product carriers, more preferably by product carriers each having a base, e.g. suspended from an overhead rail, and a movable carcass part engaging member, e.g. a cone to be introduced into the carcass part. More preferably the carcass part engaging member is movable about multiple distinct pivot axes with respect to the base of the product carrier, e.g. at least a vertical axis and a horizontal axis. Such poultry carcass part carriers are known in the art. An example is shown in FIG. 6B, wherein the product carrier base 200, the carcass part engaging cone 50, the vertical axis 201 and the horizontal axis 51 are indicated Cam track 86 and cam follower 75 operate one or more, here two, optional carrier positioners 91 of the wishbone separation device. These carrier positioners 91 are adapted to position the product carrier that carries the carcass part that is to be processed by device 3 relative to device 3. The carrier positioners 91 have a retracted and an operative position. In FIG. 9, they are shown in FIG. 9 in their retracted position. When a carcass part is arranged in front of the device 3 by a product carrier, the carrier positioners 91 are moved into their operative position, in which they engage on the movable carcass part engaging member 50 of the carrier so as to bring and preferably hold the carcass part in a good position for being processed by the device 3. In this example the member 50 includes one or more bosses 51 on which the one or more carrier positioners 91 can engage. As can be seen the one or more carrier positioners 91 are mounted on the base 41.

Preferably, both the carrier positioners 91 and the carcass part positioners 90 are kept in their operative position during the process of separating the wishbone from the carcass part. This way, they assist in holding the carcass part in the right position during this process.

In the embodiment of FIG. 9 one of the carrier positioners 91 is provided with an extension 92, that is adapted to engage one or both of the bosses 52, 53. By engaging one or both protrusions 52, 53, the extension assists in that the carrier 50 maintains its position and orientation relative to the device 3 during the processing of the carcass part 1 that is arranged on the carrier 50.

In the embodiment of FIG. 9 the wall of the drum 80 is at an angle (other than 0°) with respect to the vertical. This is advantageous, because it makes it easier to obtain an optimal relative angle between the carcass part to be processed (which is carried by carrier 50) and the device 3, in particular between the carcass part to be processed and the primary and secondary cutting paths.

Advantageously, the carrier 50 is also rotatable about a vertical axis 201. This further improves the flexibility with respect to the processing.

FIG. 10 shows a further embodiment of the device according to the first aspect of the invention.

In this embodiment, the device has been provided with a stretching block 120. This stretching block 120 is mounted in front of the primary wishbone knife 10. The stretching block 120 moves along with the primary wishbone knife 10 into and out of the carcass part, via the neck opening of the carcass part. The stretching block 120 is preferably connected to the coupler plate 71b.

The stretching block 120 has two flanks 121. These flanks 121 engage the inside of the carcass part, in the vicinity of the wing joints and the wishbone joints. The distance between the flanks 121 is such that when they engage the inside of a carcass part of a normal shape and size, they push the wing joints and/or the wishbone joints a bit outward. This puts some mechanical stress on the wishbone which helps to position the wing joints and/or the wishbone joints. The stretching block 120 can also be used in combination with the other embodiments that are described in this application.

The embodiment of FIG. 10 also comprises a frame or intermediate member 130. In this example, the frame 130 is a die cast piece, but of course it could also be made out of plate material or solid material, or be a combination of those.

The frame comprises block 131, which cooperates with the guide of base 41. Here the guide 41 extends through the block 131. A cam follower (not shown) is mounted on this block, so a movement along the guide 41 can be imposed on the frame 130. On the frame, cam plate 30 and support block 40 are mounted. A chute 79 can be mounted on or integrated in frame 130. The support block 40 is mounted on the part 132 of the frame, above the chute 79. As the support block 40 is in this embodiment mounted on the frame 130, which frame has its own cam follower, the support block 40 in this embodiment does no longer need a cam follower of its own. In case that the support block 40 has been provided with an arm 47 for removing a separated wishbone from the support block 40, a cam follower or other actuator mechanism for actuating the arm 47 will generally still be required.

In the embodiment of FIG. 10, a cutting unit is present that comprises the primary wishbone knife 10, the secondary wishbone knives 11, 21, the supports 13, 23 for the secondary wishbone knives, the coupler plate 71b and the stretching block 120. The cutting unit is moveable with and relative to the frame 130.

The frame comprises a rod 133, which extends in forward direction. In provides a connection between the block 131 and arms 135 of the frame 130, that connect the top part of the frame 130 to the lower part of the frame.

The top of the frame is provided with a wheel 134. This wheel 134 can be made to run in a cam track, thereby preventing the device to rotate around guide 41. Obviously the wheel can be dispensed with if other measures are taken to avoid such rotation, e.g. a guide having two parallel rods or otherwise.

At the start of an operating cycle the support block 40, the primary wishbone knife 10 and the secondary wishbone knives 11, 21 are in their respective first or retracted positions.

Then, the frame 130 and the cutting unit are moved downward along guide 41 together, until the support block 40 reaches its second position, between the wishbone legs.

Then, the cutting unit is moved down along guide 41 further. During this movement, the cutting unit moves relative to the frame 130. Due to this relative movement of the cutting unit and the frame 130, the cutting unit also moves relative to the cam plate 30, which is mounted onto the frame 130. By this relative movement of the cutting unit and the cam plate 30, the secondary wishbone knives 11, 21 are rotated relative to the coupler plate 71*b*. This rotation, together with the downward movement of the cutting unit makes that the secondary wishbone knives 11,21 follow their prescribed secondary cutting paths towards their respective second positions inside the carcass part, e.g. as explained with reference to FIG. 2.

At the end of the downward movement of the cutting unit, the primary wishbone knife 10 and the secondary wishbone knives 11, 21 are in their respective second positions. During the downward movement of the cutting unit, the stretching block 120 is introduced into the carcass part via the neck opening. After the introduction of the stretching block 120 into the carcass part, the flanks 121 remain in contact with the inside of the carcass part, also when the primary wishbone knife 10 and the secondary wishbone knives 11,21 have reached their respective second positions.

After the primary wishbone knife 10 and the secondary wishbone knives 11, 21 have reached their second position, they are moved back upward again towards their first positions. During the first part of this upward movement, the frame 130 and the cutting unit move upward together. The primary wishbone knife 10, the secondary wishbone knives 11, 21 and the support block 40 keep their relative positions the way they were when they all were in their respective second positions. So, they move upwards together, enclosing the at least substantially separated wishbone between them.

In the upward movement, the wishbone is cut loose from the coracoids. This can be done in the conventional way, by cutting through the legs of the wishbone, or by an anatomical cut between the bone parts of the wishbone joint, for example in the way as described in relation to the device according to the second aspect of the invention.

When the upward movement of the frame and the cutting unit together has taken the support block 40, the primary wishbone knife 10, the secondary wishbone knives 11, 21 and the wishbone out of the carcass part, the upward movement of the frame 130 stops. However, the cutting unit is moved further upward. This results in a relative movement of the cutting unit and the frame 130. The movement of the support block 40 stops with the movement of the frame 130.

The relative movement of the cutting unit and the frame 130 results in a relative movement of the cutting unit and the cam plate. This results in a rotation of the secondary cutting knives 11, 21 relative to the coupler plate of the cutting unit.

The primary wishbone knife 10 and the secondary wishbone knives 11, 21 are returned into their respective first positions at the end of the upward movement of the cutting unit.

The separated wishbone initially remains on the support block 40. When the primary wishbone knife 10 and the secondary wishbone knife no longer enclose the support block, the wishbone can be removed from the support block 40. Some wishbones may fall off under the influence of gravity. The separated wishbone can be actively removed from the support block 40 by means of compressed air, or by means of an arm such as shown in FIG. 5.

It is possible to mount additional elements or devices onto the frame 130. For example, wing joint cutters of the type described in EP1430780 can be mounted on the frame 130.

FIG. 11 shows a suitable embodiment for actuating the carcass part positioners 90 and carrier positioners 91.

In this embodiment, the carcass part positioners 90 are mounted on arms 93. Each of the arms 93 is provided with a cam track 94. The arms 93 are rotatable around the longitudinal axis of guide 41.

The cam tracks 94 of the two arms 93 cross each other. At the area where they cross, a cam wheel 95 is present in the cam tracks 94. The cam wheel 95 engages both cam tracks 94. The cam wheel 95 is mounted on shaft 96, around which it can rotate. Shaft 96 is connected to hinge body 97, which is rotatable around an axis that is perpendicular to the longitudinal direction of guide 41. Also mounted to hinge body 97 is the cam follower 74, which runs into a cam track on the drum of a carrousel (not shown). The axis of rotation of the cam wheel 95 is substantially perpendicular to the axis of rotation of the cam follower 74, so that when cam follower 74 is moved up and down, the cam wheel 95 moves forwards and backwards.

By moving the cam wheel 95 backwards, the area where the cam tracks 94 of the arms 93 cross comes to lie further behind the guide rail 41. This causes the carcass part positioners 90 to move towards each other. On the other hand, moving the cam wheel 95 forwards, the area where the cam tracks 94 of the arms 93 cross comes to lie closer to the guide rail 41. This causes the carcass part positioners 90 to move away from each other. This way, the carcass part positioners 90 can be moved between a position in which they engage and position the carcass part and a position wherein they don't.

Likewise, the carrier positioners 91 are mounted on arms 93*. Each of the arms 93* is provided with a cam track 94*. The arms 93* are rotatable around the longitudinal axis of guide 41.

The cam tracks 94* of the two arms 93* cross each other. At the area where they cross, a cam wheel 95* is present in the cam tracks 94*. The cam wheel 95* engages both cam tracks 94*. The cam wheel 95* is mounted on shaft 96*, around which it can rotate. Shaft 96* is connected to hinge body 97*, which is rotatable around an axis that is perpendicular to the longitudinal direction of guide 41. Also mounted to hinge body 97* is the cam follower 75, which runs into a cam track on the drum of a carrousel (not shown). The axis of rotation of the cam wheel 95* is substantially perpendicular to the axis of rotation of the cam follower 75, so that when cam follower 75 is moved up and down, the cam wheel 95* moves forwards and backwards.

By moving the cam wheel 95* backwards, the area where the cam tracks 94* of the arms 93* cross comes to lie further behind the guide rail 41. This causes the carcass part positioners 90 to move towards each other. On the other hand, moving the cam wheel 95* forwards, the area where the cam tracks 94* of the arms 93* cross comes to lie closer to the guide rail 41. This causes the carcass part positioners 90 to move away from each other. This way, the carcass part positioners 90 can be moved between a position in which they engage and position the carcass part and a position wherein they don't.

The hinge bodies 97 and 07* are arranged between side plates 98, for reasons of safety.

The arms 93 and 93* can be curved in order to make sure that the cam wheels 95 and 95*, respectively, remain in contact with both cam tracks 94 and 94*, respectively, during the entire stroke of the cam wheels.

In this example, the carrier positioners 91 are provided with pads 99 that are adapted to engage a carrier.

This way of actuating the positioners can be used in combination with any of the embodiments described in this application. Likewise, the pads 99 can be used in combination with any of the embodiments described in this application.

It is envisaged that the device according to the first aspect of the invention is used in a system for processing carcass parts of slaughtered poultry. FIG. 12 shows a part of such a system.

The system comprises a transport system 100 for moving the carcass parts to be processed along a track 101. The transport system is provided with a plurality of carriers 50 for carrying the carcass parts to be processed. Each of the carriers 50 is connected to a trolley 54 that runs over a rail 55. The trolleys 54 are connected to each other by a chain 56, a cable or the like.

In the embodiment of FIG. 3, the devices 3 are arranged on a carrousel 102. However, the skilled person will understand that it is also possible that one or more devices are arranged alongside the track on a different kind of structure, such as a fixed frame or movable carriage.

FIGS. 13 and 14 show the bones in the neck region of a bird, in this example a hen. FIG. 13 shows them in perspective, while FIG. 14 provides a front view.

In these figures we see the wishbone 2, the coracoids 4 and the shoulder blades 7. In the wishbone 2, the tuberositas furcularis 8 is indicated. In the coracoids 4, the acrocoracoid 9 is indicated. The wishbone 2 and the coracoids 4 are connected to each other in the wishbone joint by tendons and/or ligaments 140.

When the wishbone 2 and the coracoids are separated from each other by means of an anatomical cut, these tendons and/or ligaments 140 are cut through. The knife moves through the wishbone joint without cutting through the wishbone or the coracoids; it merely passes by these bones by moving through the joint between them.

FIG. 15 shows an embodiment of the device and method according to the second aspect of the invention.

FIG. 15A shows the wishbone 2 and the adjacent coracoids 4. At the wishbone joints 5, the ends of the wishbone and the coracoids come together. The ends of the wishbone 2 and the coracoids are connected to each other by soft tissue such as tendons and ligaments at the wishbone joints 5.

The dashed lines in FIG. 15 indicate the outline of the upper part of the carcass part 1 that is to be processed.

In the example of FIG. 15A, support 110 is generally shaped as an inverted T. The skilled person will understand that the support 110 can have all kinds of suitable shapes, like a flat or curved plate or a bracket.

Wishbone joint cutters 111 are connected to the support 110. The wishbone joint cutters 111 are pivotable relative to the support 110 around pivot axes 112.

In FIG. 15A, the support 110 is in its first position, outside the carcass part 1. The wishbone joint cutters 111 are in their inactive position. The situation shown in FIG. 15A can be regarded as the initial situation of an operating cycle.

From the situation that is shown in FIG. 15A, the support is moved to its second position. The second position is inside the carcass part 1. In FIG. 15B, the support is shown in its second position. The support 110 with the wishbone joint cutters 111 is introduced into the carcass part 1 via the neck opening 6. The wishbone joint cutters 111 are still in their inactive position.

FIG. 15C shows a next phase in the operational cycle. In FIG. 15C, the wishbone joint cutters 111 have been brought into their active position. Now, the wishbone joint cutters 11 extend into the region between the wishbone 2 and the coracoids 4.

FIG. 15D shows a following phase. The support 110 is being moved back from the second position to the first position. The wishbone joint cutters 111 are still in their active position. By the movement of the support 110 back to the first position while the wishbone joint cutters are in their active position, the wishbone joint cutters are moved through the wishbone joints so that the wishbone joint cutters 111 cut through wishbone joints, thereby separating the ends of the wishbone 2 from the ends of the coracoids 4. So, the wishbone joints are cut through by wishbone joint cutters that are arranged in the interior of the carcass part; the wishbone joints are cut through from the inside of the carcass part.

FIG. 15E shows the situation right after the wishbone joints have been cut through. The wishbone joint cutters 111 are still in their active position, and the support 110 is being moved further towards its first position. Somewhere along this movement back to the first position or after this movement, the wishbone joint cutters are moved back into their inactive position.

FIG. 15F shows the situation at the end of the operational cycle. The support 110 is back in its first position, and the wishbone joint cutters 111 are back in their inactive position. The device is ready for a new operational cycle.

In FIG. 15, the support actuator assembly and the wishbone joint cutters actuator assembly are not shown for reasons of clarity. The support actuator assembly and the wishbone joint cutters actuator assembly can for example be based on the combination of a cam track and a cam follower.

FIG. 16 shows a further embodiment of the device according to the second aspect of the invention. In this embodiment, devices according to the first and second aspect of the invention are combined. In the example of FIG. 16, wishbone joint cutters 111 are combined with the embodiment shown in FIG. 7. The skilled person will understand that wishbone joint cutters can also be combined with other embodiments of the device according to the first aspect of the invention.

In the embodiment shown in FIG. 16, the wishbone joint cutters 111 are mounted on the primary wishbone knife 10. In the example of FIG. 16, they are mounted on the front of the primary wishbone knife 10, but it's also possible that they are mounted on the back of the primary wishbone knife.

When the wishbone joint cutters 111 are mounted on the primary wishbone knife 10, the primary wishbone knife actuator assembly acts as support actuator assembly.

FIG. 16 shows cam follower 115, which cooperates with a cam track (not shown) in order to move the wishbone joint cutters 111 from their inactive position to their active position and vice-versa. In this example, the movement of the cam follower 115 is changed into a rotation of the wishbone joint cutters by means of lever mechanism 116.

In the embodiment of FIG. 16, the wishbone joint cutters 111 are sickle-shaped. This helps in positioning the wishbone joint relative to the wishbone joint cutters, and prevents the tougher and/or more slippery tissues (such as tendons) to slip off the wishbone joint cutters.

The wishbone joint cutters can have a sharp or a relatively blunt surface. They can be moved from their inactive position to their active position by means of a rotational movement, a translation, or a combination of a rotation and a translation.

FIG. 17 shows a further embodiment of the device according to the second aspect of the invention, in different stages of the operational cycle. In this embodiment, the device according to the second aspect of the invention is combined with an embodiment of a device according to the first aspect of the invention.

FIG. 17A shows a cutting unit with a primary wishbone knife 210 and two secondary wishbone knives 211,221. The primary wishbone knife 210 in this embodiment has a different shape then in the embodiments described above. In this embodiment, the top of the arrow-shaped part of the primary wishbone knife 210 is narrower than in the other embodiments. This way, additional room is made for the wishbone joint cutters 311. The tip of the primary wishbone knife 210 of this embodiment has the same shape as the primary wishbone knives of the embodiments previously discussed.

In the embodiment of FIG. 17, a stretching block 320 is provided. This stretching block 320 has been provided with slits through which the wishbone joint cutters 311 can project.

In the embodiment of FIG. 17, the wishbone joint cutters 311 are provided with cam wheels 312. These cam wheels 312 run in cam tracks 313. The wishbone joint cutters 311 can pivot about axes 314. These axes extend through slit 315 in the wishbone joint cutters 311. Slits 315 allow translation of the wishbone joint cutters 311 relative to the axes 314. Axes 314 can be connected to a coupler plate of the kind described in relation to the other embodiments, or to a frame of the type described in the embodiment of FIG. 11. The wishbone joint cutters have a cutting edge 316. This cutting edge can be sharp or blunt.

The actuation of the wishbone joint cutters 311 can be achieved by means of a dedicated wishbone joint cutters actuator assembly, that e.g. comprises a cam follower that cooperates with a cam track on the drum of a carrousel. It is also possible to actuate the wishbone joint cutters 311 in a way that is comparable with the way the secondary wishbone knives are actuated in the embodiment of FIG. 11, so by making use of the movement of the cutting unit together with and relative to a frame that is mounted on a guide rail.

In the embodiment of FIG. 17, the operational cycle starts when the primary wishbone knife 210, the secondary wishbone knives 211,221 and the stretching block 320 are in their respective first positions. The wishbone joint cutters 311 are also in their inactive positions. In the example of FIG. 17, the cutting edges 316 of the wishbone joint cutters are arranged in such a way that they do not project from the flanks 321 of the stretching block 320. This situation is shown in FIG. 17A.

Then, the primary wishbone knife 210, the secondary wishbone knives 211,221 and the stretching block 320 are moved into their second positions. The wishbone joint cutters are still in the same position relative to the primary wishbone knife 210 and the stretching block 320. This situation is shown in FIG. 17B.

Then, the wishbone joint cutters are moved to their active position. In this embodiment, this means that the cutting edges 316 come to project outside the flanks 321 of the stretching block 320. This is done by rotation of the wishbone joint cutters 311 around the axes 314. After or during this rotation, the wishbone joint cutters 311 are moved upwardly relative to the stretching block 320 and the primary wishbone knife 210. The position of the wishbone joint cutters 311 is shown in FIG. 17C.

During this upward movement, the wishbone joint cutters separate the wishbone from the coracoids. Preferably, this is done by making an anatomical cut, which means that the wishbone joint cutters move through the wishbone joint between the bone parts, cutting through only soft tissue like tendons and ligaments.

In a different embodiment, it is possible that the wishbone joint cutters are pivoted outside the contour of the stretching block 320, and then the wishbone joint cutters are moved upwardly together with the stretching block, the primary wishbone knife and the secondary wishbone knives, and that they separate the wishbone from the coracoids in this upward movement.

In the embodiment of FIG. 17, after the wishbone has been separated from the coracoids, the wishbone cutters 311 are moved back into a position in which the cutting edges 316 do no longer project from the stretching block 320.

Then, the primary wishbone knife 210, the secondary wishbone knives 211, 221 and the stretching block 320 are moved back together out of the carcass part, and then back to their respective first positions.

FIG. 18 shows a special embodiment of a wishbone joint cutter 311 according to the invention.

In the wishbone joint cutter of FIG. 18, the cutting edge 316 has been provided with a facet 317. This facet 317 provided an upwardly sloping cutting edge. It is in particular advantageous if the slope of the facet is adapted to the shape of the acrocoracoid and the tuberositas furcularis.

Furthermore, the wishbone joint cutter 311 of FIG. 18 has been provided with a hinge 318. This hinge 318 allows the cutting edge to be tilted relative to the part of the wishbone joint cutter that is connected to the cutter unit.

When using a wishbone joint cutter of the type shown in FIG. 18, the wishbone joint cutter 311 will direct itself in such a way that is encounters the least resistance from the wishbone joint. As the tendons and ligaments are softer tissue than the wishbone and the coracoids, the cutting edge 316 of the wishbone joint cutter 311 will assume such a position that an anatomical cut is made through the wishbone joint, regardless of the natural variation in shapes and sizes of the carcass parts that are processed.

The skilled person will understand that an improved anatomical cut can already be achieved by using either the facet 317 or the hinge 318, but that the best results can be expected when both the facet and the hinge are applied.

The embodiment of the wishbone joint cutter 311 of FIG. 18 can be used in the embodiment of the device of FIG. 17, but the skilled person will understand that its use is not limited to this device.

The invention claimed is:

1. A device for separating a wishbone from a carcass part of slaughtered poultry, the carcass part comprising:
 a neck opening,
 bone parts, that comprise:
  a wishbone, said wishbone having an outer contour, and
  at least a part of the rib cage, and
 tissue parts, that comprise:
  at least a part of the meat that is naturally present on the wishbone and the rib cage, and
  at least a part of the tissue connecting said meat to the one or more of the bone parts,
 said device comprises comprising:
 a primary wishbone knife, for separating the wishbone from meat that is naturally present thereon in the plane of the wishbone, wherein the primary wishbone knife is adapted to be introduced into and removed from the carcass part via the neck opening,
 two secondary wishbone knives, each for separating the wishbone from meat that is present on an outside of a leg of the wishbone, and
 a secondary wishbone knives actuator assembly,
 wherein the secondary wishbone knives actuator assembly prescribes a secondary cutting path for each of the secondary wishbone knives relative to the carcass part,
 wherein each of said secondary cutting paths extend between a first position, in which said secondary wishbone knife is outside the carcass part and a second position, in which said secondary wishbone knife is arranged inside the carcass part, adjacent to the wishbone and outside of the leg of the wishbone, and wherein, the secondary cutting paths have a curved shape that substantially follows the outer contour of the wishbone.

2. The device according to claim 1, wherein each secondary wishbone knife has a tip, and wherein the tips of the secondary wishbone knives are moved towards each other during their movement from the first position to the second position.

3. The device according to claim 1, wherein in their respective first positions, the secondary wishbone knives are arranged substantially parallel to each other.

4. The device according to claim 1, wherein the movement of the secondary wishbone knives from their respective first positions to their respective second positions starts with a translation.

5. The device according to claim 4, wherein the discharge unit is arranged adjacent to or at least partly in the wishbone support block.

6. The device according to claim 1, wherein the movement of the secondary wishbone knives along the secondary cutting paths involves both translation and rotation.

7. The device according to claim 1, wherein the device further comprises a wishbone support block, for supporting the wishbone, and a support block actuator assembly, the support block being movable by the support block actuator assembly along a path between a first position, in which the support block is outside the carcass part, and a second position, in which the support block is arranged inside the carcass part and supporting the wishbone, the path being such that the support block is introduced into and removed from the carcass part via the neck opening.

8. The device according to claim 7, wherein the wishbone support block in its second position is arranged adjacent to the primary wishbone knife and the secondary wishbone knives when the primary wishbone knife and the secondary wishbone knives are in their respective second positions.

9. The device according to claim 7, wherein the wishbone support block, the primary wishbone knife and the secondary wishbone knives when in their respective second positions simultaneously, together substantially enclose the wishbone.

10. The device according to claim 7, wherein the device comprises a base or frame to which the wishbone support block and/or an intermediate member, associated with the secondary wishbone knives actuator assembly are mounted.

11. The device according to claim 10, wherein the base or frame is moveable relative to a carrousel.

12. The device according to claim 10, wherein the primary wishbone knife and the secondary wishbone knives are arranged in a cutting unit in which said primary wishbone knife and the secondary wishbone knives are mechanically coupled for their actuation, and wherein the cutting unit is moveable relative to the base or frame.

13. The device according to claim 1, wherein the secondary wishbone knives actuator assembly comprises a cam track that is associated with at least one secondary wishbone knife.

14. The device according to claim 8, wherein the secondary wishbone knives are pivotably mounted on a coupler, said coupler being moveable relative to the cam track.

15. The device according to claim 1, wherein at least one secondary wishbone knife has a leading edge, and said leading edge of at least one secondary wishbone knife is inclined.

16. The device according to claim 1, wherein the primary wishbone knife is generally arrow-shaped, with a forked or gouge-shaped tip.

17. The device according to claim 1, wherein the primary wishbone knife has an arrow shape, said arrow shape having a wide side having a first end and a second end, a first tip being present on said first end and a second tip being present on said second end, and wherein the tips on the wide side of the arrow shape project out of the plane of the rest of the primary wishbone knife.

18. The device according to claim 1, wherein the device further comprises a stretching block having flanks for engaging the inside of the carcass part in the vicinity of the wing joints.

19. The device according to claim 1, wherein the primary wishbone knife and the secondary wishbone knives are mechanically coupled for their actuation by an actuation assembly.

20. The device according to claim 1, wherein the carcass part to be processed further comprises:
    at least a part of the coracoids,
    at least one wishbone joint, connecting a free end of the wishbone and a free end of the coracoids,
    and wherein the device further comprises:
    a wishbone joint cutters actuator assembly,
    at least two wishbone joint cutters, the wishbone joint cutters being arranged on a support that has an outer contour, and the wishbone joint cutters being moveable from an inactive position to an active position and vice versa by the wishbone joint cutters actuator assembly, and
    a support actuator device,
    wherein the support on which the wishbone joint cutters are arranged is moveable along a path by the support actuator assembly between a first position outside the carcass part, and a second position, in which the support is arranged inside the carcass part, the path being such that the support is introduced into and removed from the carcass part via the neck opening,
    wherein during the movement of the support from the first position to the second position, at least for a part of the path between the neck opening and the second position, the wishbone joint cutters are in an inactive position, and
    wherein during the movement of the support from the second position to the first position, at least for a part of the path between the second position and the neck opening, the wishbone joint cutters are in an active position, in which active position the wishbone joint cutters project from the outer contour of the support and extend between the coracoids and the wishbone or between the bone parts of the wishbone joints.

21. The device according to claim 1, wherein the device further comprises a primary wishbone knife actuator assembly, the primary wishbone knife being moveable relative to the carcass part by the primary wishbone knife actuator assembly along a primary cutting path between a first position, outside the carcass part, and a second position, in which the primary wishbone knife is arranged inside the carcass part, adjacent to the wishbone and substantially parallel to the wishbone.

22. The device according to claim 1, wherein the device further comprises a discharge unit for discharging a wishbone that was separated from the carcass part.

23. The device according to claim 22, wherein the discharge unit comprises an ejector member, for pushing the wishbone off the wishbone support block.

24. The device according to claim 23, wherein the discharge unit comprises a cam follower and cam track for controlling the movement of the ejector member.

25. The device according to claim 22, wherein the discharge unit comprises a chute for receiving a discharged wishbone.

26. The device according to claim 1, wherein the wishbone separating device further comprises a positioner for positioning a carrier relative to the knives of the wishbone separation device.

27. The device according to claim 1, wherein the wishbone separating device further comprises a positioner for positioning the carcass part that is to be processed relative to the knives of the wishbone separation device.

28. A system for processing carcass parts of slaughtered poultry, said system comprising:
  at least one wishbone separating device for separating a wishbone from a carcass part of slaughtered poultry, and
  a transport system comprising a plurality of product carriers, a track and a drive system for moving the product carriers along the track,
  wherein the product carriers are adapted to hold the carcass part during the processing of said carcass part by the device according to claim 1.

29. A system for processing carcass parts of slaughtered poultry, said system comprising:
  a wishbone separating device, said wishbone separating device comprising:
    a primary wishbone knife, for separating the wishbone from meat that is naturally present on the wishbone in the plane of the wishbone, and
    two secondary wishbone knives, each for separating the wishbone from meat that is present at an outer contour of the legs of the wishbone, and
  a transport system comprising a plurality of product carriers, a track that extends along said wishbone separating device and a drive system for moving the product carriers along the track,
  wherein the product carriers are adapted to hold the carcass part during the processing of said carcass part by the wishbone separating device,
  wherein the product carrier is moveable relative to the wishbone separating device such that the product carrier makes the secondary wishbone knives follow a prescribed secondary cutting path relative to the carcass part,
  wherein each of said secondary cutting paths extends between a first position, in which said secondary wishbone knife is outside the carcass part and a second position, in which said secondary wishbone knife is arranged inside the carcass part, adjacent to the wishbone and outside of the legs of the wishbone, and
  wherein, the secondary cutting paths have a curved shape that substantially follows the outer contour of the wishbone.

30. A method for separating a wishbone from a carcass part of slaughtered poultry, said method comprising the steps of:
  providing a carcass part of slaughtered poultry having:
    a neck opening,
    bone parts, that comprise:
      at least a part of the wishbone, said wishbone having an outer contour, and
      at least a part of the rib cage,
    tissue parts, that comprise:
      at least a part of the meat that is naturally present on the wishbone and the rib cage, and
      at least a part of the tissue connecting said meat to the one or more of the bone parts,
  providing a primary wishbone knife, for separating the wishbone from meat that is naturally present on the wishbone in the plane of the wishbone,
  moving the primary wishbone knife from a first position, outside the carcass part, to a second position, in which the primary wishbone knife is arranged inside the carcass part, adjacent to and substantially parallel to the wishbone, thereby introducing the primary wishbone knife into the carcass part via the neck opening, thereby separating the wishbone from meat adjacent to the wishbone, in a plane substantially parallel to the plane of the wishbone,
  providing two secondary wishbone knives, each for separating the wishbone from meat that is present on the outside of the legs of the wishbone, and a secondary wishbone knives actuator assembly,
  moving each of the secondary wishbone knives by the secondary wishbone knives actuator assembly along a prescribed secondary cutting path from a first position, in which said secondary wishbone knife is outside the carcass part to a second position, in which said secondary wishbone knife is arranged inside the carcass part, adjacent to the wishbone and outside of the legs of the wishbone, thereby separating the wishbone from the meat adjacent to the outer contour of the legs of the wishbone,
  moving the primary wishbone knife from its second position back to its first position, thereby removing the primary wishbone knife via the neck opening of the carcass part, and
  moving the secondary wishbone knives from their respective second position back to their respective first position,
  wherein, the secondary cutting paths are curved and extend substantially along the outer contour of the wishbone.

31. The method according to claim 30, which method further comprises the following steps:
  prior to introducing the primary wishbone knife into the carcass part, providing a support block, for supporting the wishbone, and
  moving the support block from a first position, in which the support block is outside the carcass part, to a second position, in which the support block is arranged inside the carcass part and supporting the wishbone, thereby introducing the support block into the carcass part via the neck opening.

32. A device for separating the wishbone from the coracoids of a carcass part of slaughtered poultry,
  the carcass part comprising:
    a neck opening,
    bone parts, that comprise:
      at least a part of the wishbone, said wishbone having an outer contour,
      at least a part of the coracoids,
      at least one wishbone joint, connecting a free end of the wishbone and a free end of the coracoids, and
      at least a part of the rib cage,
  the device comprising:
    a wishbone joint cutters actuator assembly,
    two wishbone joint cutters, the wishbone joint cutters being arranged on a support that has an outer contour, and the wishbone joint cutters being moveable from an inactive position to an active position and vice versa by the wishbone joint cutters actuator assembly, and
    a support actuator device,
  wherein, the support on which the wishbone joint cutters are arranged is moveable along a path by the support actuator assembly between a first position, wherein the wishbone joint cutters are arranged outside the carcass part, and a second position, in which the wishbone joint cutters are arranged inside the carcass part, the path being such that the wishbone joint cutters are introduced into and removed from the carcass part via the neck opening, wherein during the movement of the support from the first position to the second position, at least for a part of the path between the neck opening and the second position, the wishbone joint cutters are in an inactive position, and wherein during the movement of the support from the second position to the first position, at least for a part of the path between the second position and the neck opening, the wishbone joint cutters are in an active position, in which active position the wishbone joint cutters project from the outer contour of the support and extend between the coracoids and the wishbone or between the bone parts of the wishbone joints.

33. The device according to claim 32, wherein the support is a primary wishbone knife, for separating the wishbone from meat that is naturally present thereon behind the wishbone, the primary wishbone knife in its second position being arranged adjacent to the wishbone and behind the wishbone.

34. The device according to claim 32, wherein the wishbone joint cutters are arranged within the outer contour of the support during at least a part of the movement of the support from its first position to its second position.

35. The device according to claim 32, wherein the device further comprises a wishbone separating assembly.

36. The device according to claim 32, wherein the wishbone joint cutters are provided with a hinge.

37. The device according to claim 32, wherein the wishbone joint cutters are provided with a facet.

38. A system for processing carcass parts of slaughtered poultry, system comprising:
a device for separating a wishbone from a carcass part of slaughtered poultry, and
a transport system comprising a plurality of product carriers, a track and a drive system for moving the product carriers along the track,
wherein the product carriers are adapted to hold the carcass part during the processing of said carcass part by the device according to claim 32.

39. A system for processing carcass parts of slaughtered poultry, the system comprising:
a separating device for separating the wishbone from the coraroids, the separating device comprising:
a wishbone joint cutters actuator assembly,
two wishbone joint cutters, the wishbone joint cutters being arranged on a support that has an outer contour, and the wishbone joint cutters being moveable from an inactive position to an active position and vice versa by the wishbone joint cutters actuator assembly, and
a transport system comprising a plurality of product carriers, a track that extends along said device and a drive system for moving the product carriers along the track,
wherein the product carriers are adapted to hold the carcass part during the processing of said carcass part by the wishbone separating device,
wherein, the product carriers are moveable relative to the support on which the wishbone joint cutters are arranged along a path between a first position wherein the wishbone joint cutters are outside the carcass part, and a second position, in which the support and the wishbone joint cutters are arranged inside the carcass part, the path being such that the wishbone joint cutters are introduced into and removed from the carcass part via the neck opening, wherein during the movement from the first position to the second position, at least for a part of the path between the neck opening and the second position, the wishbone joint cutters are in an inactive position, and wherein during the movement from the second position to the first position, at least for a part of the path between the second position and the neck opening, the wishbone joint cutters are in an active position, in which active position the wishbone joint cutters project from the outer contour of the support and extend between the coracoids and the wishbone or between the bone parts of the wishbone joints.

40. The system according to claim 39, wherein the carriers are moveable relative to the track in a plurality of planes.

41. A method for separating the wishbone from the coracoids of a carcass part of slaughtered poultry, said method comprising the steps of:
providing a carcass part of slaughtered poultry, which carcass part comprises:
a neck opening, and
bone parts, that comprise:
at least a part of the wishbone,
at least a part of the coracoids,
at least one wishbone joint, connecting a free end of the wishbone and a free end of the coracoids, and
at least a part of the rib cage,
providing two wishbone joint cutters, the wishbone joint cutters being arranged on a support that has an outer contour, and the wishbone joint cutters having an active and an inactive position,
bringing the support into a first position, outside the carcass part, and bringing the wishbone joint cutters in their inactive position,
moving the support with the wishbone joint cutters from the first position to a second position inside the carcass part, thereby introducing the support with the wing cutters into the carcass part via the neck opening, the wishbone joint cutters remaining in their inactive position during this movement to the second position of the support,
bringing the wishbone joint cutters into their active position, in which the wishbone joint cutters project from the outer contour of the support,
moving the support with the wishbone joint cutters from the second position in the direction of the first position, thereby making the wishbone joint cutters extend between the legs of the wishbone and the coracoid,
moving the support with the wishbone joint cutters further towards the first position, thereby making the wishbone joint cutters cut through the wishbone joint,
moving the support with the wishbone joint cutters further towards the first position, thereby making the support with the wishbone joint cutters leave the interior of the carcass part via the neck opening, and
returning the support to its first position and the wishbone joint cutters to their inactive position.

42. The method according to claim 41, wherein the wishbone joint cutters are retracted from their active position into their inactive position before the support with the wishbone joint cutters leaves the interior of the carcass part.

43. The method according to claim 41, wherein the wishbone joint cutters are arranged within the outer contour of the support when the wishbone joint cutters are in their inactive position.

44. The method according to claim 41, wherein the wishbone joint cutters in their active position are moved between the bone parts of the wishbone joint.

45. A system for processing a carcass part of slaughtered poultry, said system comprising:
- a carrousel, and
- a plurality of wishbone separation devices according to claim 1,
- wherein the plurality of wishbone separation devices are mounted on said carrousel.

46. The system according to claim 45, wherein the carrousel comprises one or more cam tracks for controlling the movement of one or more parts of the one or more wishbone separation devices.

47. The system according to claim 45, wherein the system further comprises a transport system for moving the carcass parts to be processed along a track, said transport system being provided with a plurality of carriers for carrying the carcass parts to be processed.

48. A method for separating a wishbone from a carcass part of slaughtered poultry, said method comprising the steps of:
- providing a carcass part of slaughtered poultry, the carcass part comprising:
  - a neck opening,
  - bone parts, that comprise:
    - at least a part of the wishbone,
    - at least a part of the coracoids,
    - at least one wishbone joint, connecting a free end of the wishbone and a free end of the coracoids,
    - at least a part of the rib cage,
  - tissue parts, that comprise:
    - at least a part of the meat that is naturally present on the wishbone and the rib cage, and
    - at least a part of the tissue connecting said meat to the one or more of the bone parts,
- providing a primary wishbone knife, for separating the wishbone from meat that is naturally present on the back of the wishbone, and a primary wishbone knife actuator assembly,
- providing two wishbone joint cutters, the wishbone joint cutters having an active and an inactive position,
- bringing the wishbone joint cutters in their inactive position,
- moving the primary wishbone knife by the primary wishbone knife actuator assembly along a primary cutting path between a first position, outside the carcass part, and a second position, in which the primary wishbone knife is arranged inside the carcass part, adjacent to the wishbone behind the wishbone, the primary cutting path being such that the primary wishbone knife is introduced into and removed from the carcass part via the neck opening,
- providing two secondary wishbone knives, each for separating the wishbone from meat that is present on the outside of the legs of the wishbone, and a secondary wishbone knives actuator assembly,
- moving each of the secondary wishbone knives by the secondary wishbone knives actuator assembly along a secondary cutting path from a first position, in which said secondary wishbone knife is outside the carcass part and a second position, in which said secondary wishbone knife is arranged inside the carcass part, adjacent to the wishbone and outside of the legs of the wishbone, the leading edges of the secondary wishbone knives being pointed towards each other when both secondary wishbone knives are in their respective second positions, and, the secondary cutting paths being such that the secondary wishbone knives are introduced into and removed from the carcass part via the neck opening,
  - wherein in their respective first positions, the secondary wishbone knives are arranged at a first relative angle and in their respective second positions, the secondary wishbone knives are arranged at a second relative angle,
  - wherein the first relative angle is an acute angle or an angle of zero degrees and the second relative angle is an acute angle,
- and the first relative angle is smaller than the second relative angle,
- bringing the wishbone joint cutters into the carcass part via the neck opening, and moving them into their active position,
- cutting through the wishbone joint by the wishbone joint cutters, and
- returning the primary wishbone knife and the secondary wishbone knives to their respective first positions and the wishbone joint cutters to their inactive position.

49. The method according to claim 48, wherein the wishbone joint is cut through before the primary wishbone knife and the secondary wishbone knives start their movement from their respective second positions to their respective first positions.

* * * * *